United States Patent
Olms et al.

[11] Patent Number: 5,850,891
[45] Date of Patent: Dec. 22, 1998

[54] MOTORIZED RACK SYSTEM

[75] Inventors: Joseph Jeffery Olms; Gerald Thomas Crance, both of Salinas; Marko Konstantin Lubic, Pebble Beach, all of Calif.

[73] Assignee: Trimble Navigation Limited, Sunnyvale, Calif.

[21] Appl. No.: 961,566

[22] Filed: Oct. 30, 1997

[51] Int. Cl.[6] .................................................... B60R 9/00
[52] U.S. Cl. .................. 182/127; 224/310; 414/462; 248/503
[58] Field of Search .................. 182/127; 224/310; 414/462; 248/503

[56] References Cited

U.S. PATENT DOCUMENTS

| | | | |
|---|---|---|---|
| 3,627,158 | 12/1971 | Kobasic . | |
| 5,058,791 | 10/1991 | Henriquez | 224/310 |
| 5,398,778 | 3/1995 | Sexton | 182/127 |
| 5,421,495 | 6/1995 | Bubik | 224/310 |

*Primary Examiner*—Alvin Chin-Shue
*Attorney, Agent, or Firm*—Patrick T. King

[57] ABSTRACT

A motorized rack system for loading and unloading long items such as ladders includes a static rack for holding one end of a ladder and a pivoting and extendible rack. The extendible ladder rack assembly includes a base member mounted to the roof of a vehicle, an elongated pivoting member, and a slideable ladder carriage member. The system also includes a mechanism for positioning the pivotable and extendible ladder rack assembly in a first locked down position of the ladder rack, a second tilted position, and a third tilted/extended position for loading and unloading a ladder. A cable is coupled to the one end of the pivoting member and a cable-spooling mechanism pays out and reels in the cable for positioning the motorized ladder rack.

29 Claims, 22 Drawing Sheets

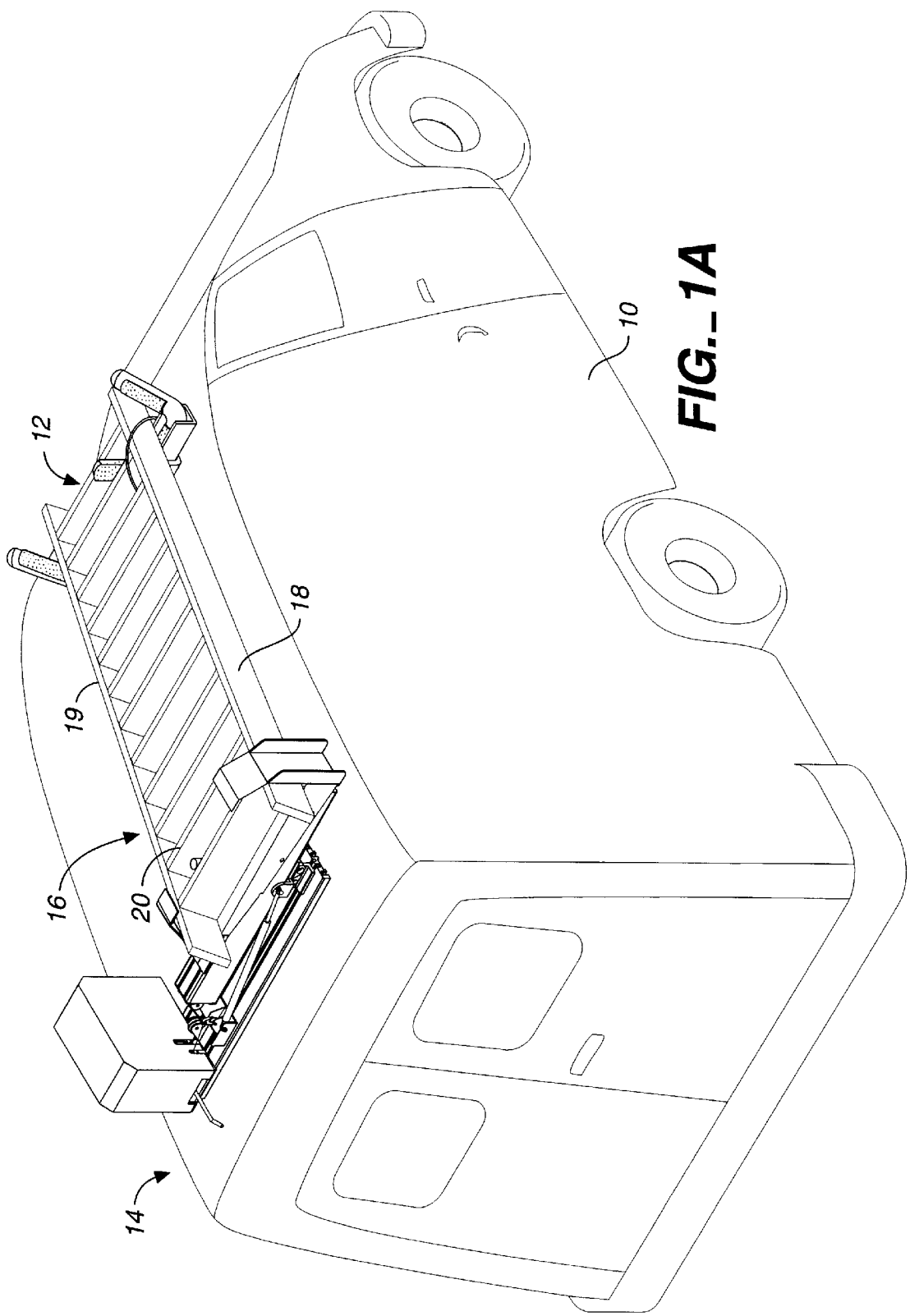
FIG._1A

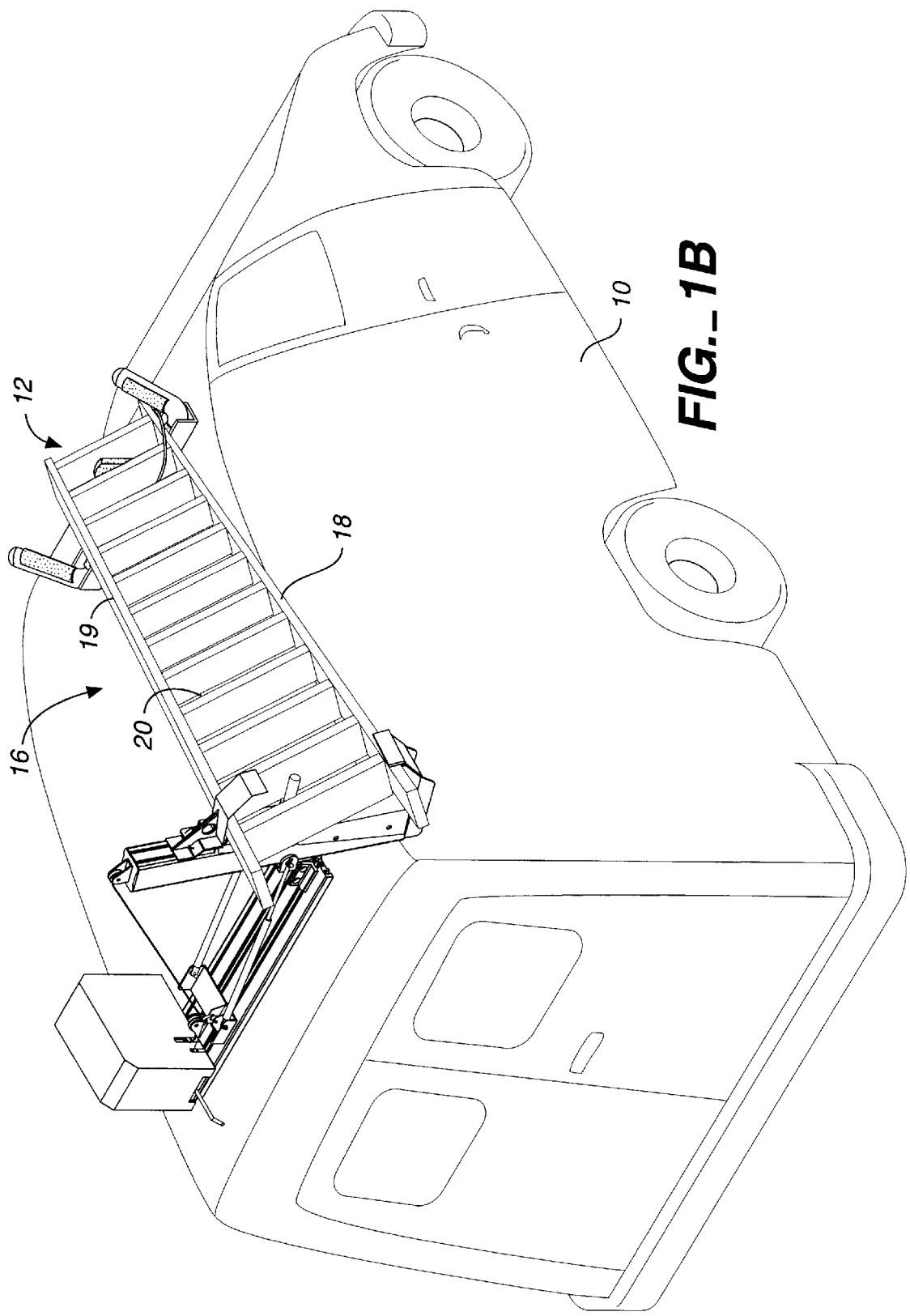

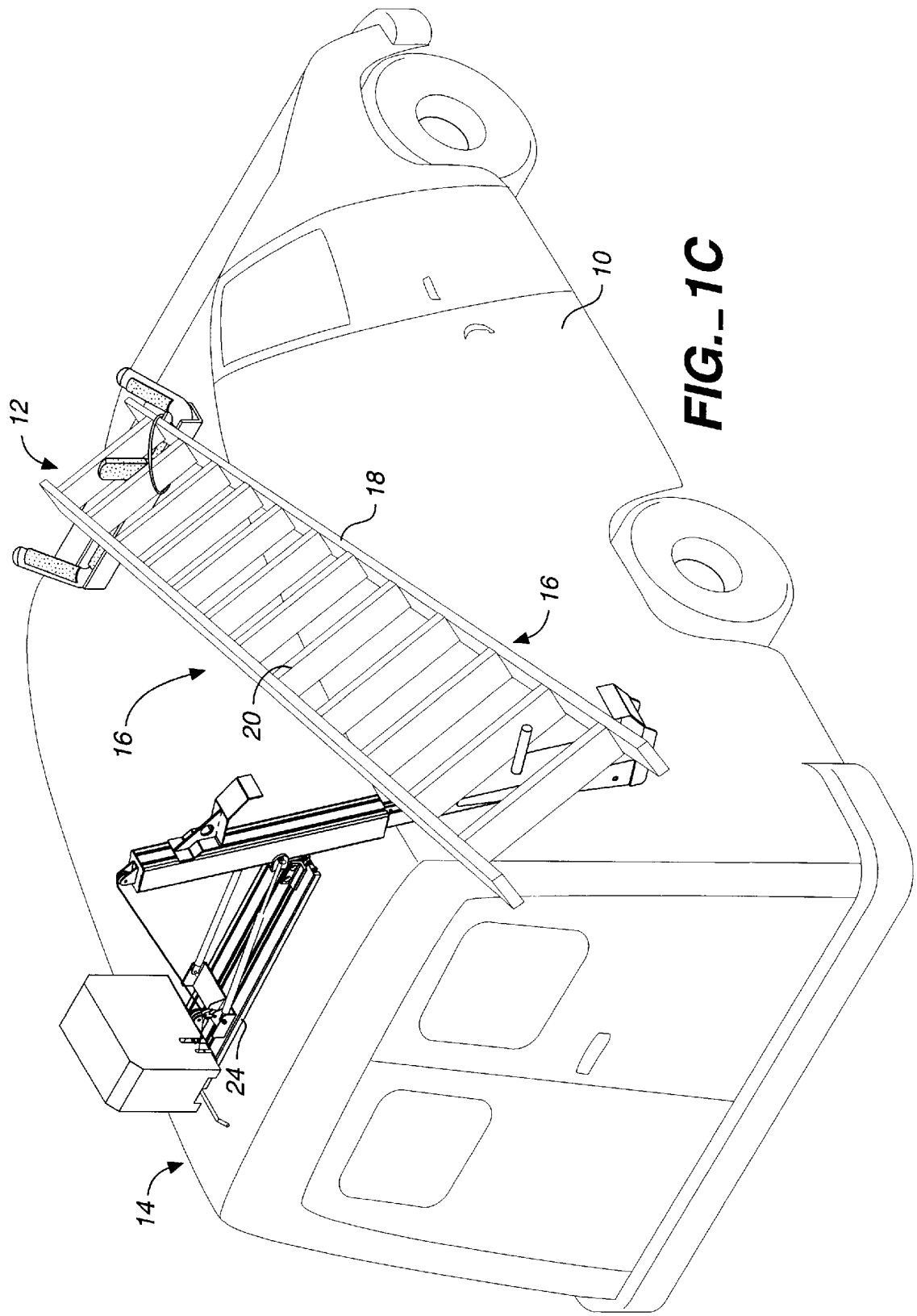

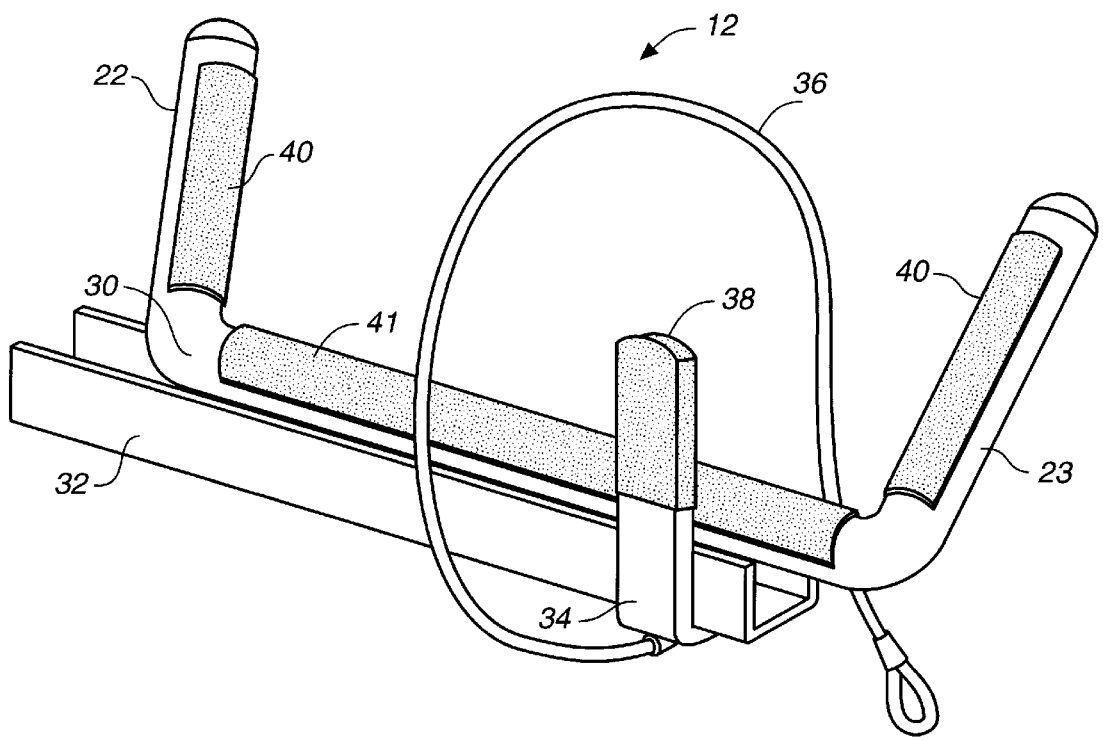
FIG._2

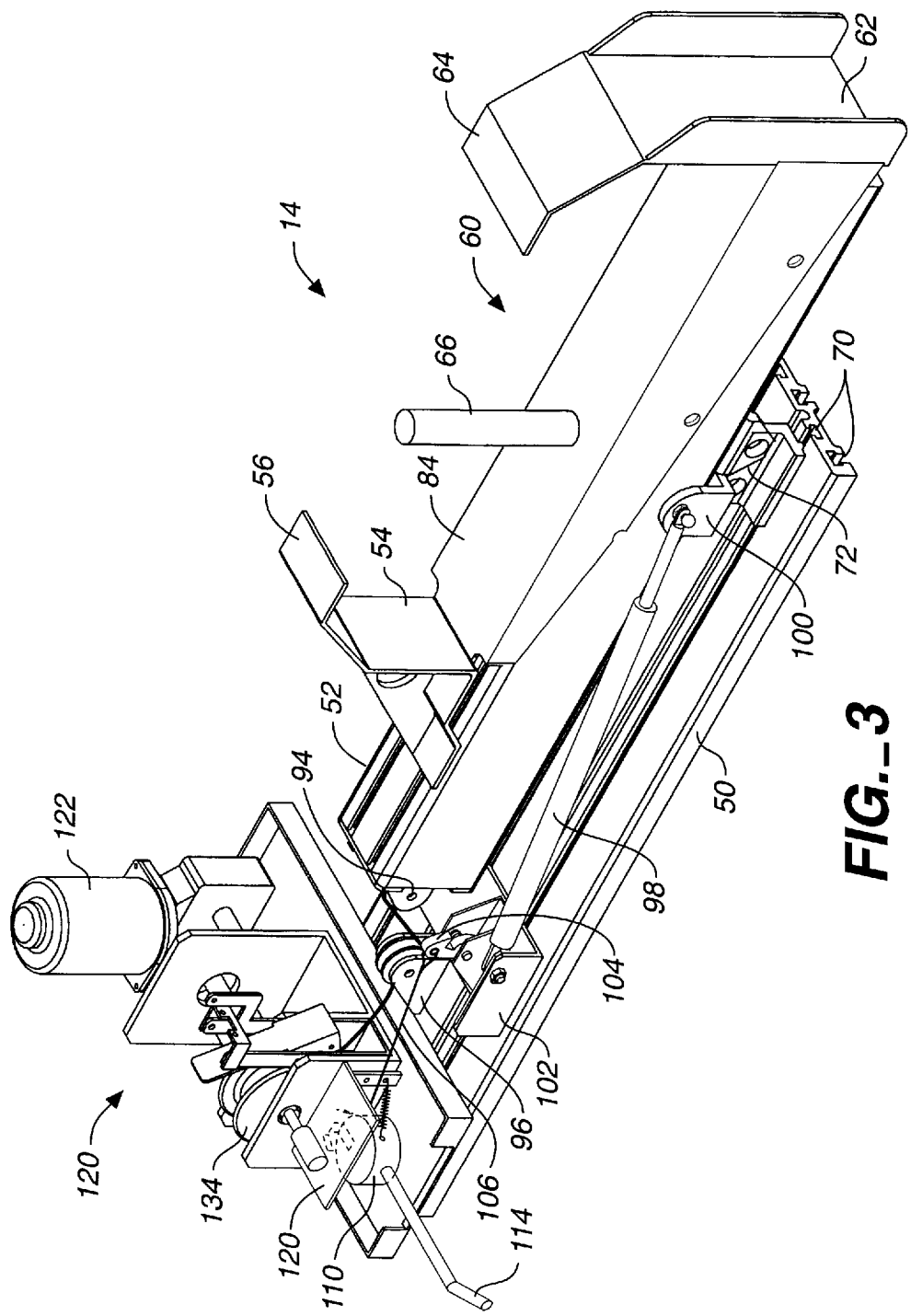
FIG._3

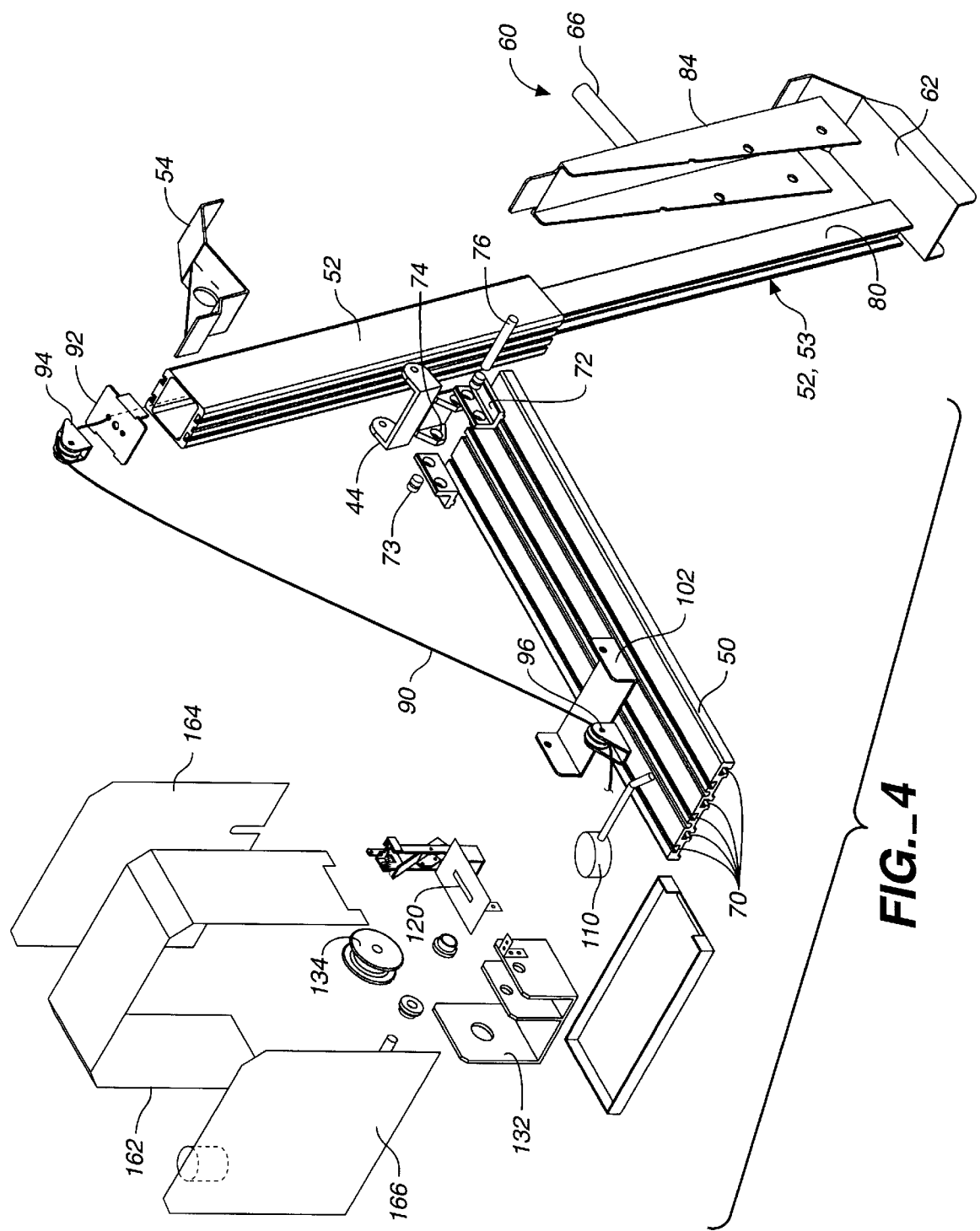
FIG._4

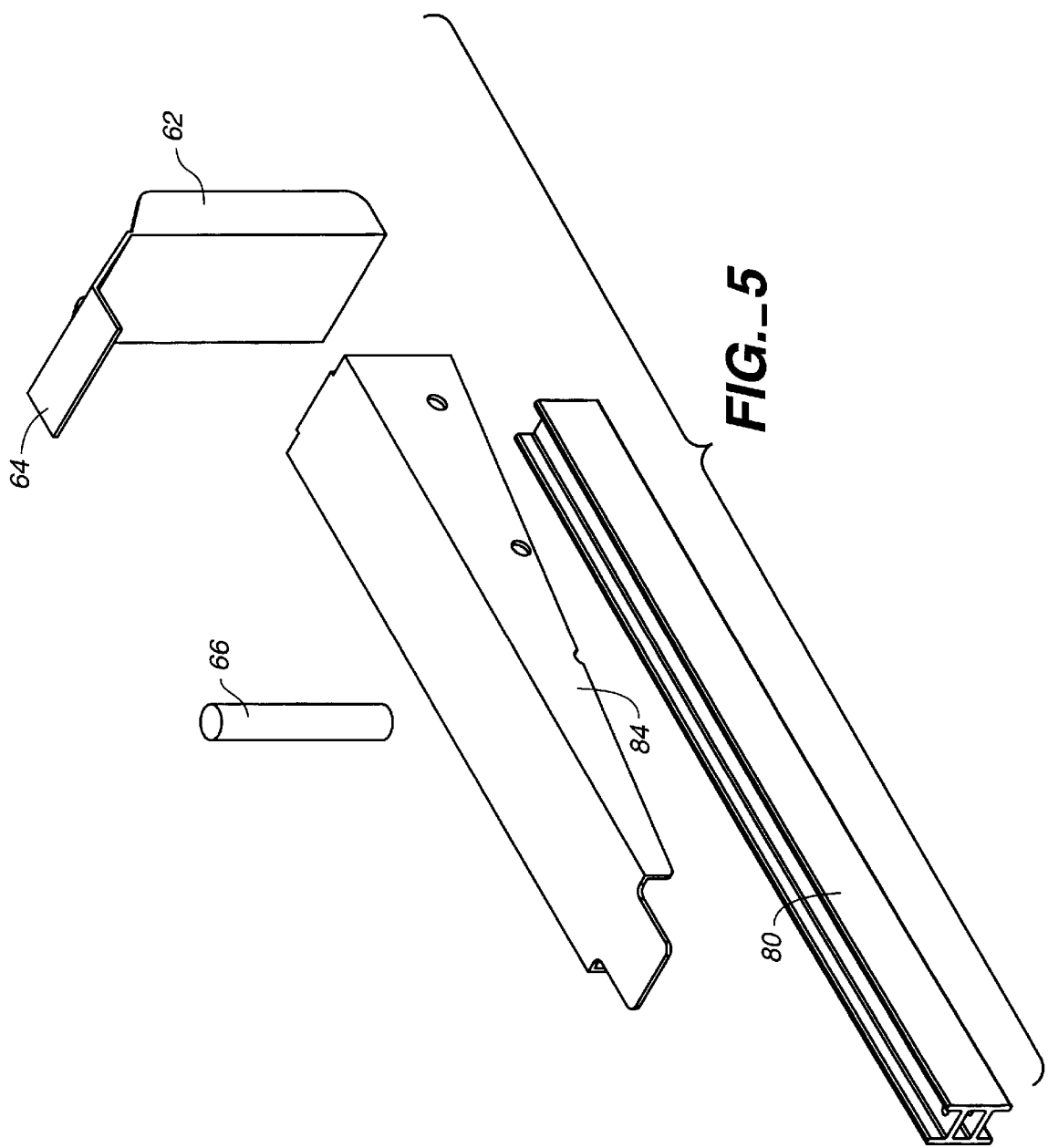
FIG._5

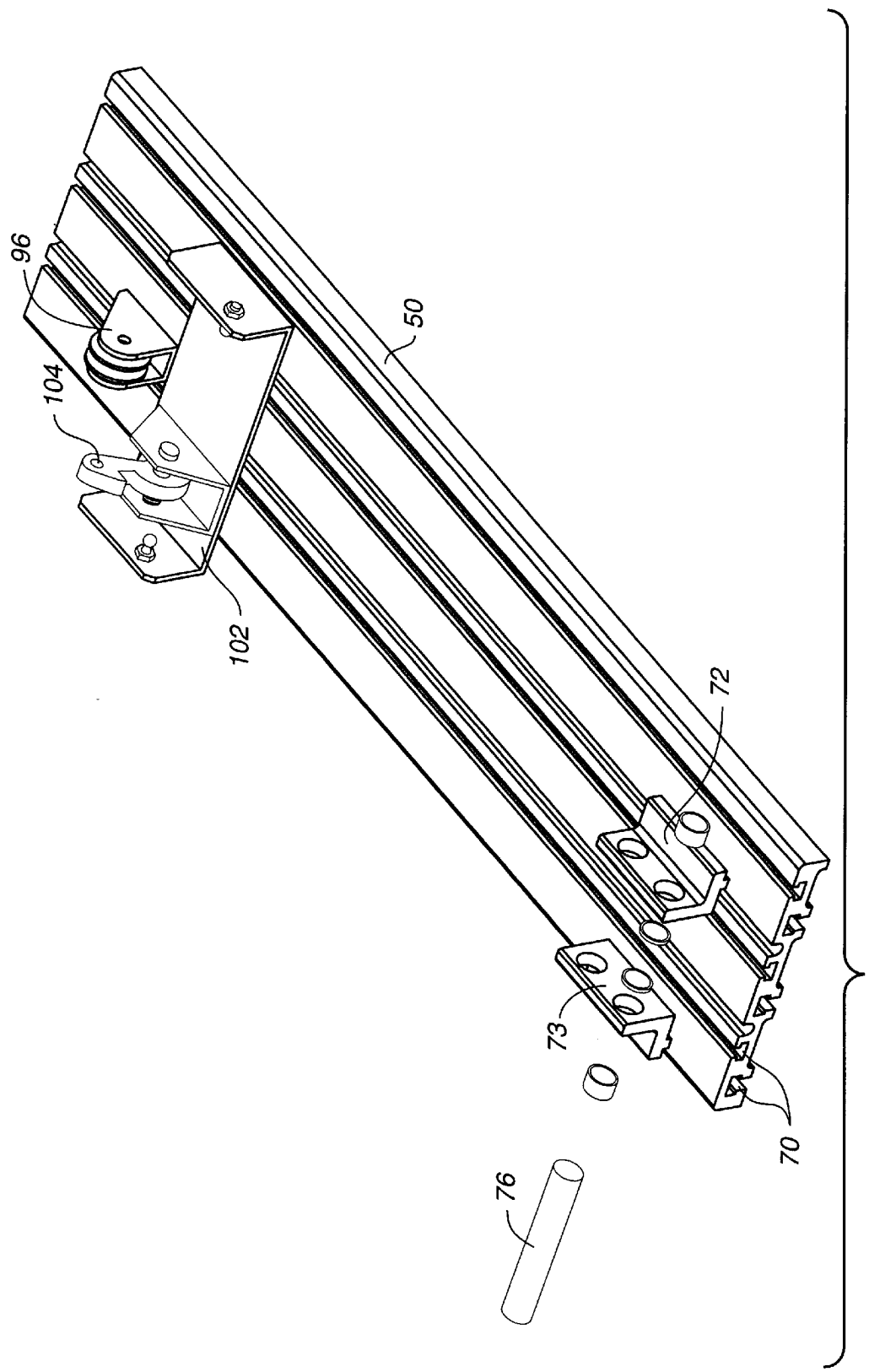
FIG._6

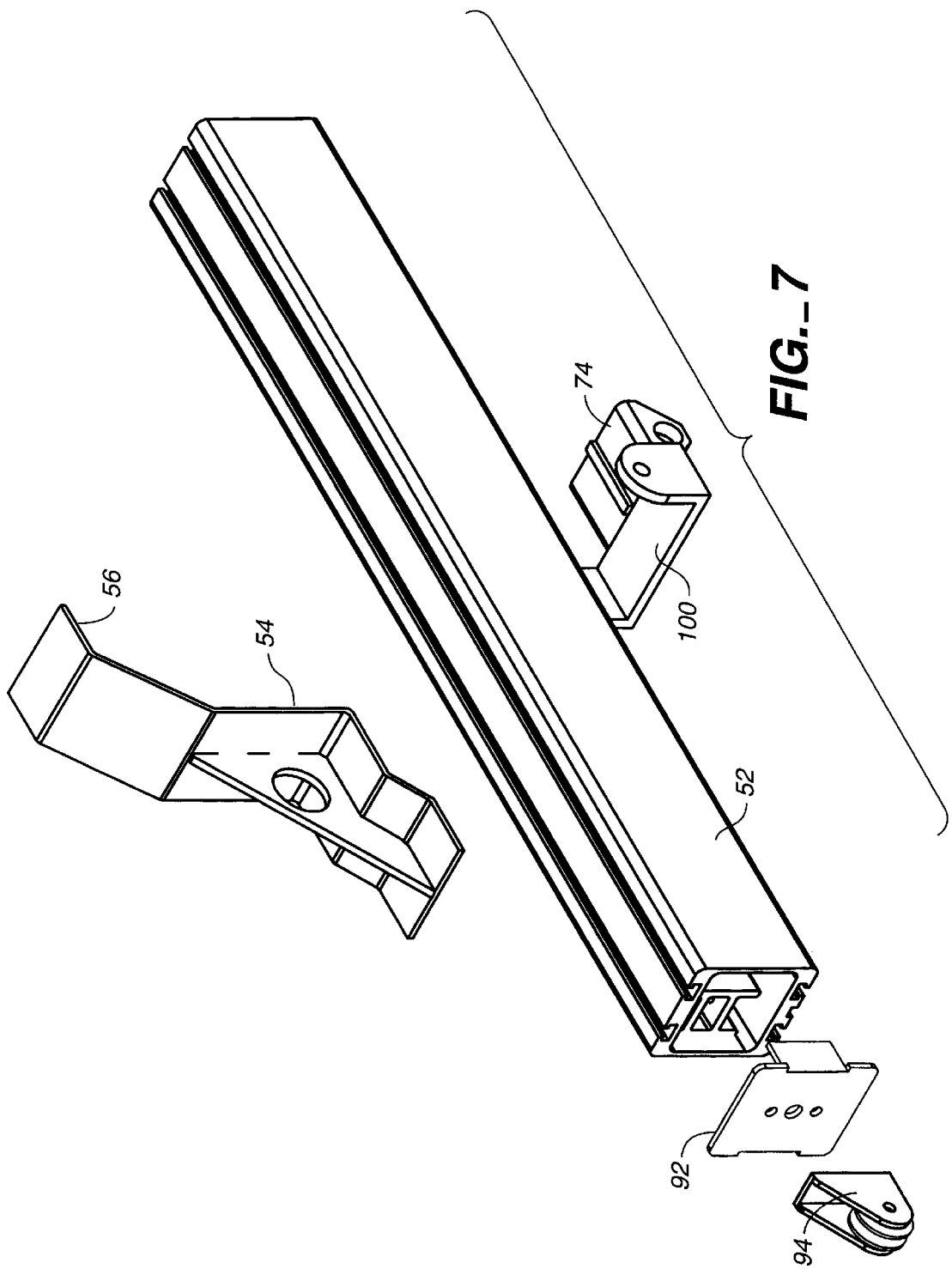

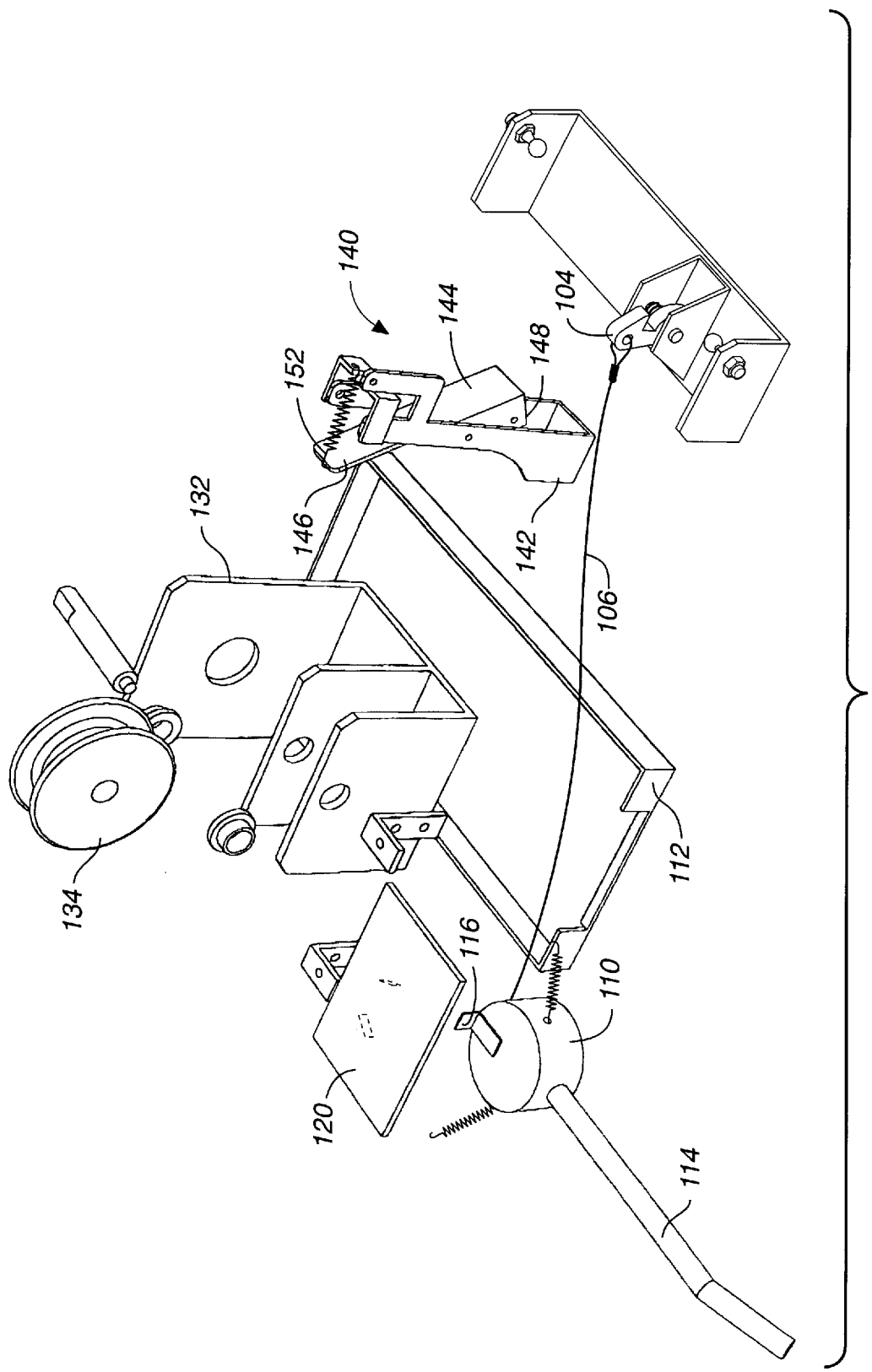
FIG._8

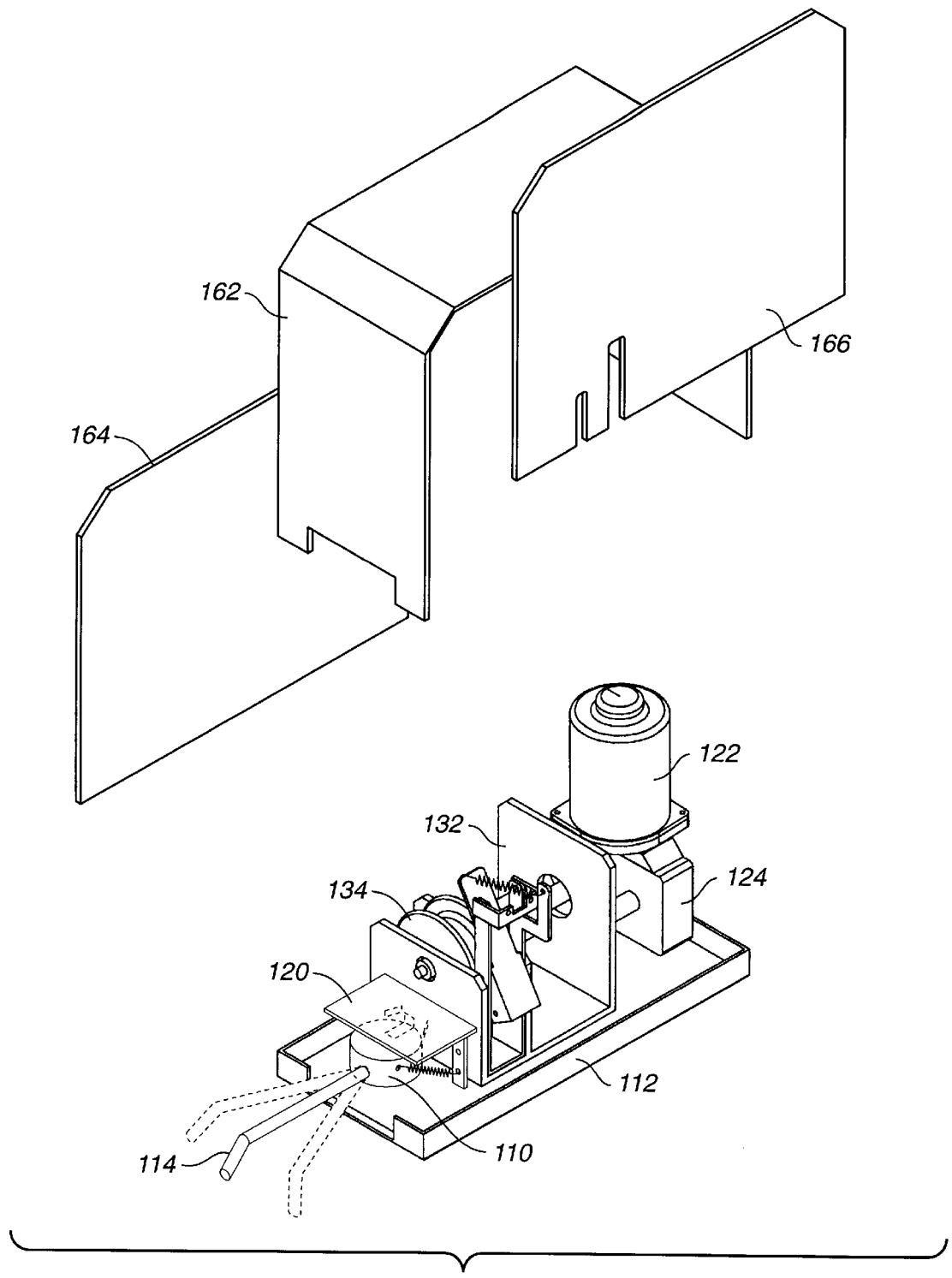
FIG._9

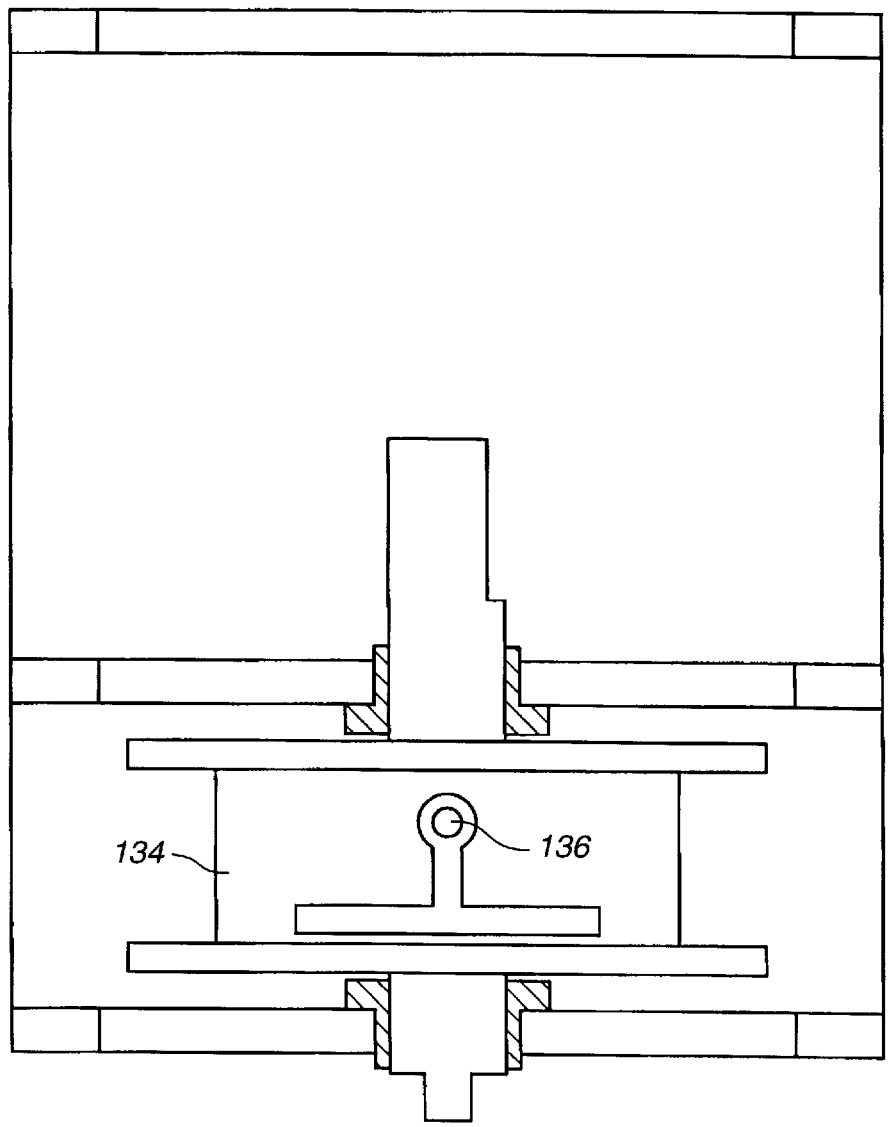
FIG._10

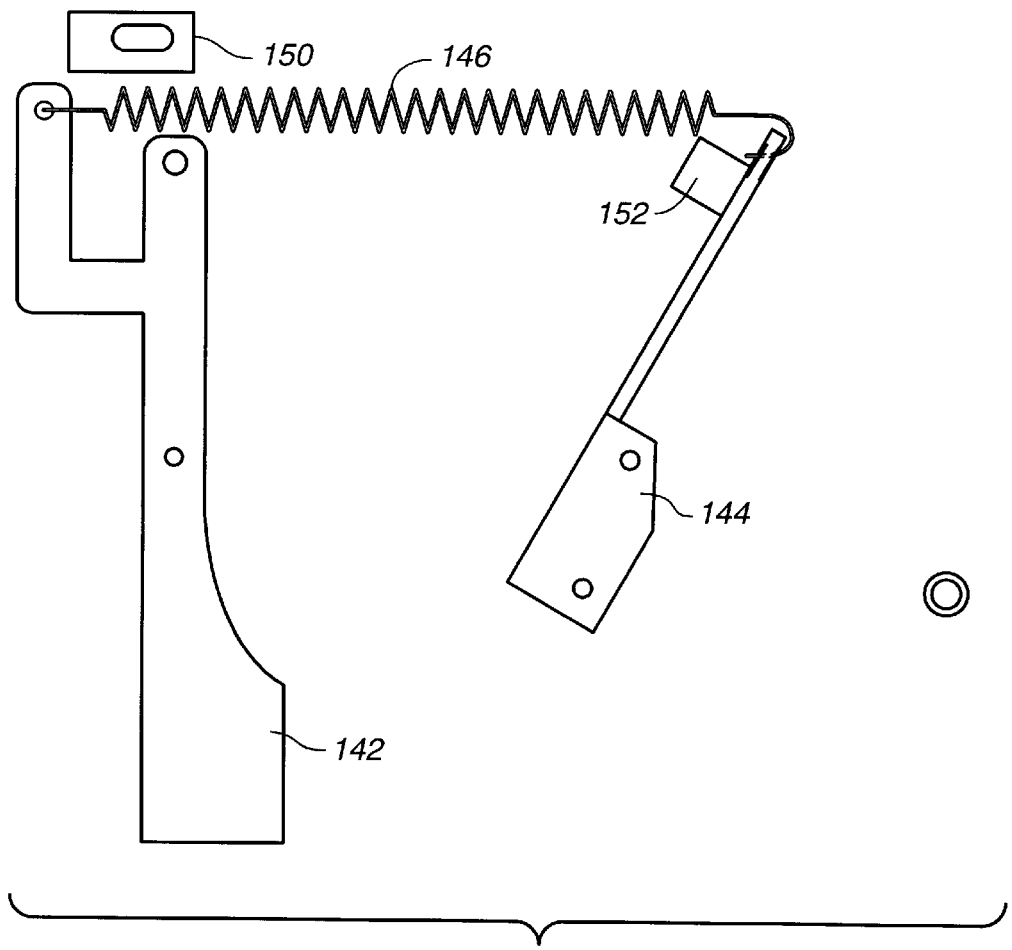
FIG._11

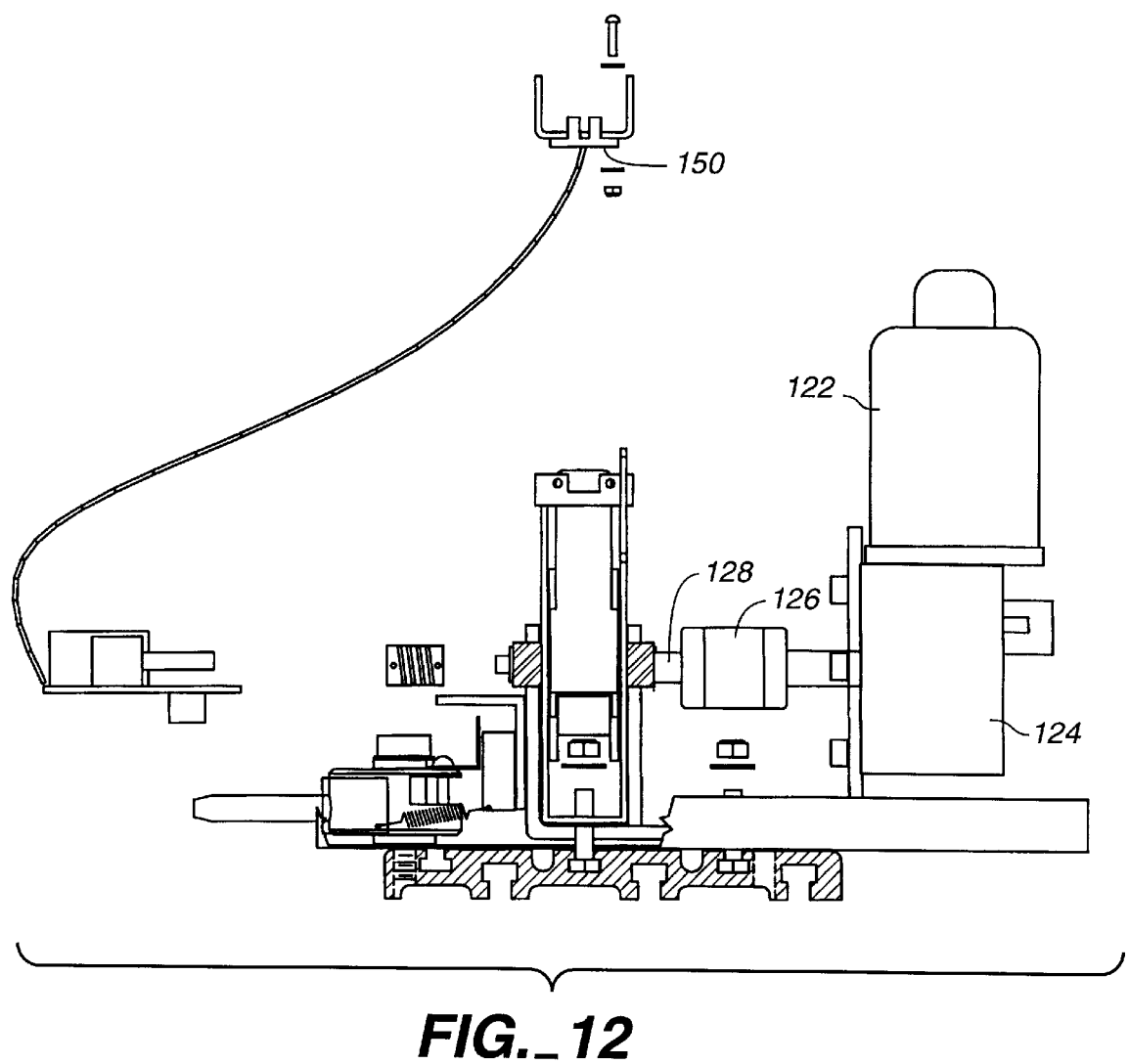
FIG._12

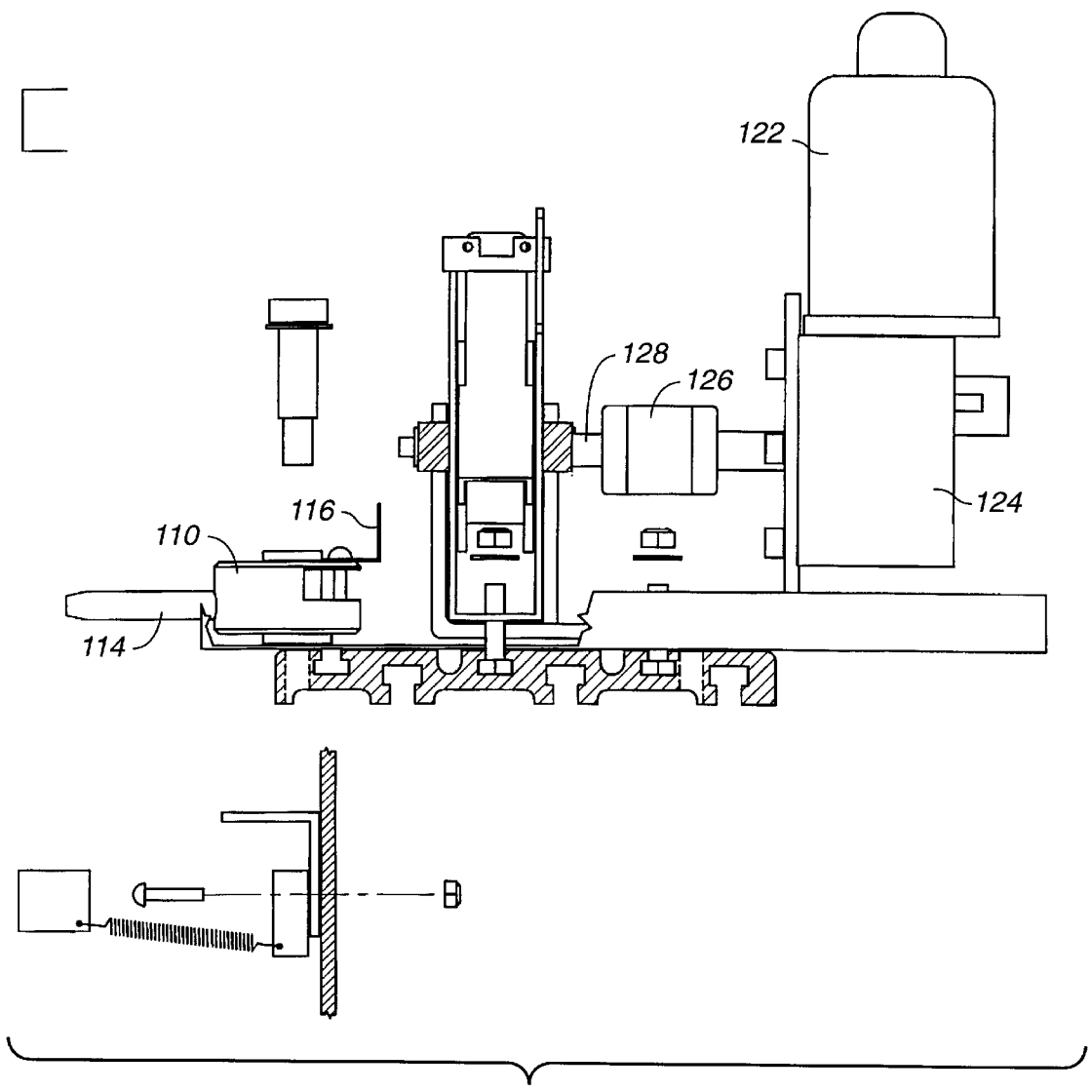
FIG._13

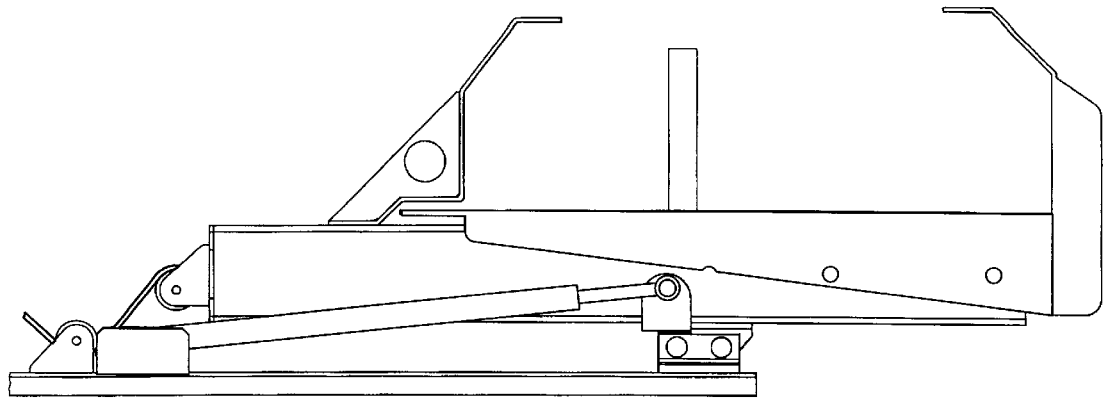
FIG._14
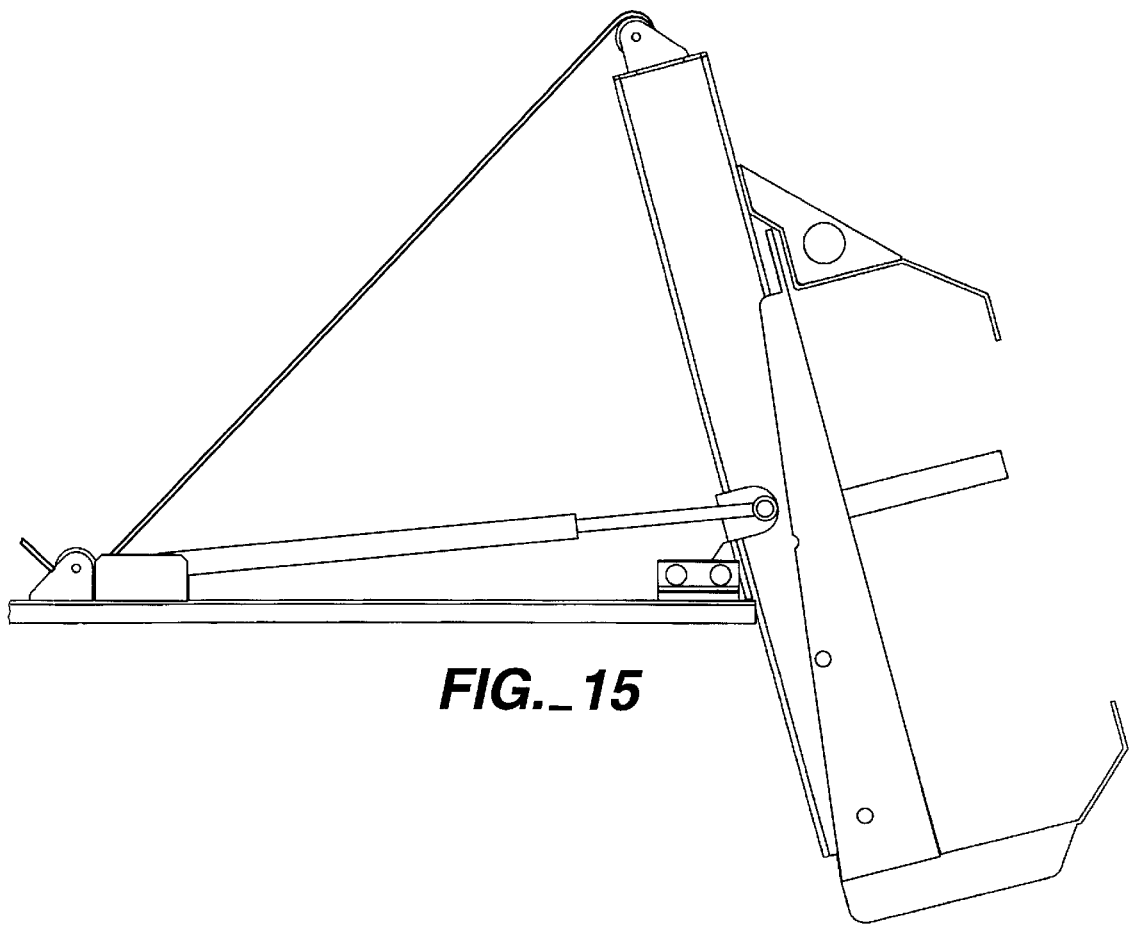
FIG._15

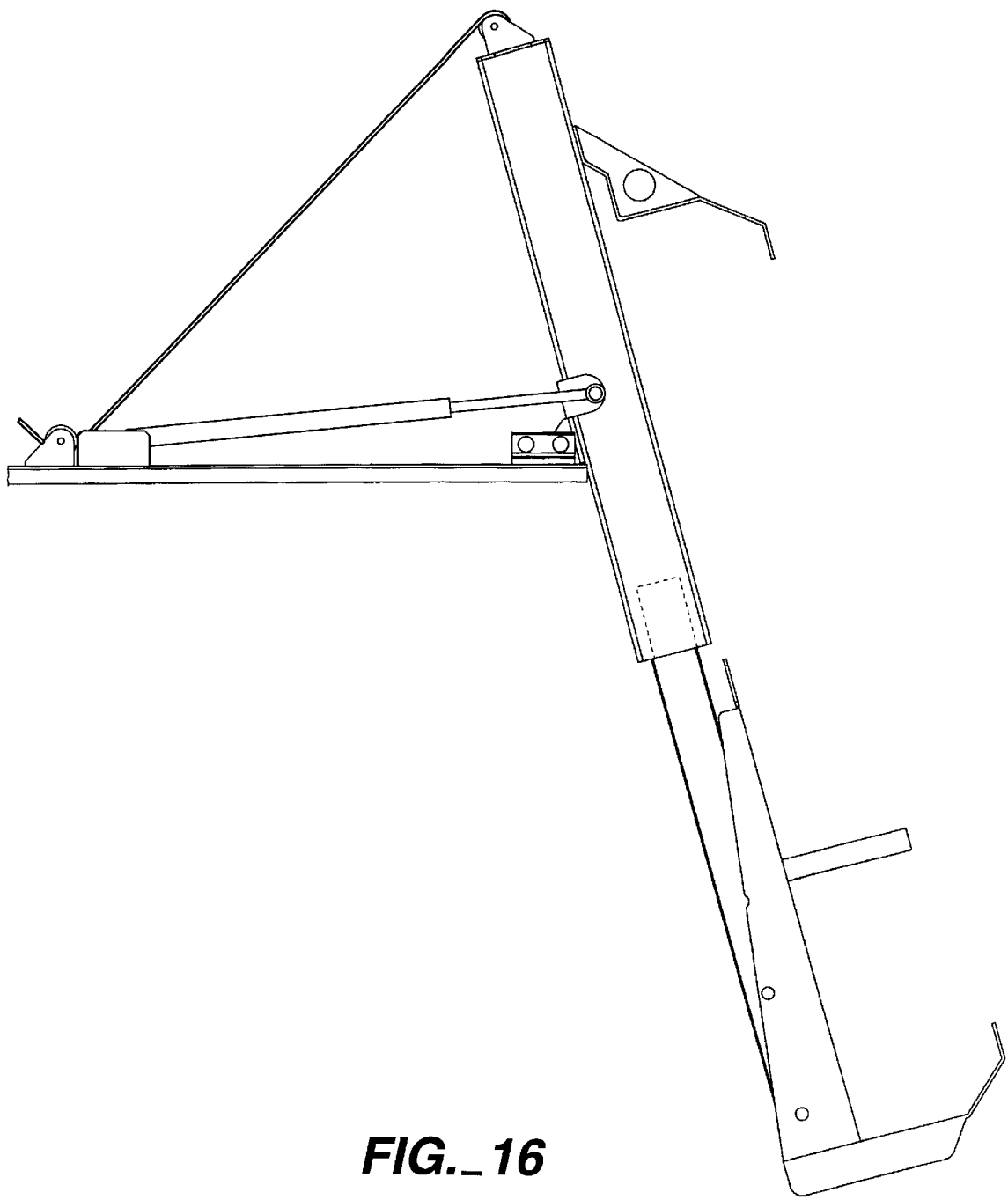
FIG._16

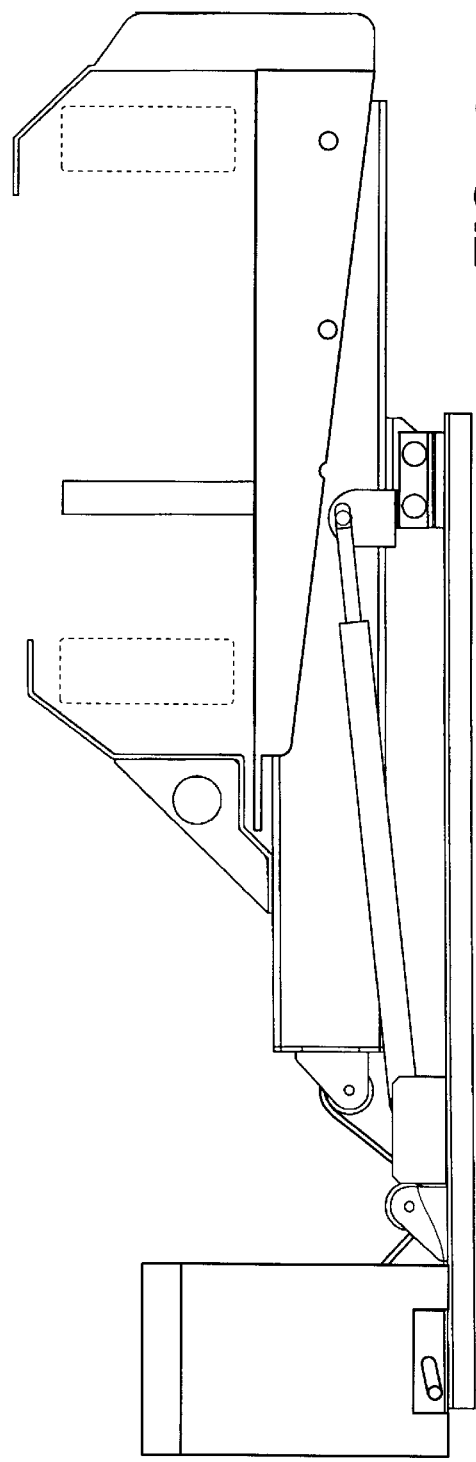
FIG._17
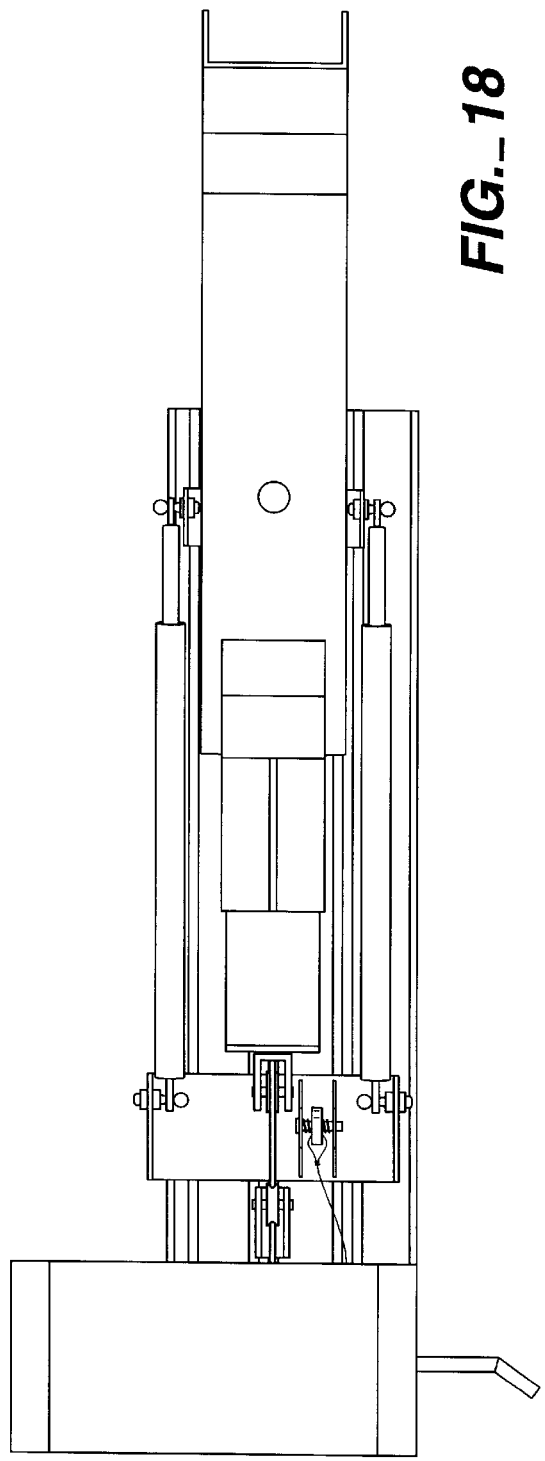
FIG._18

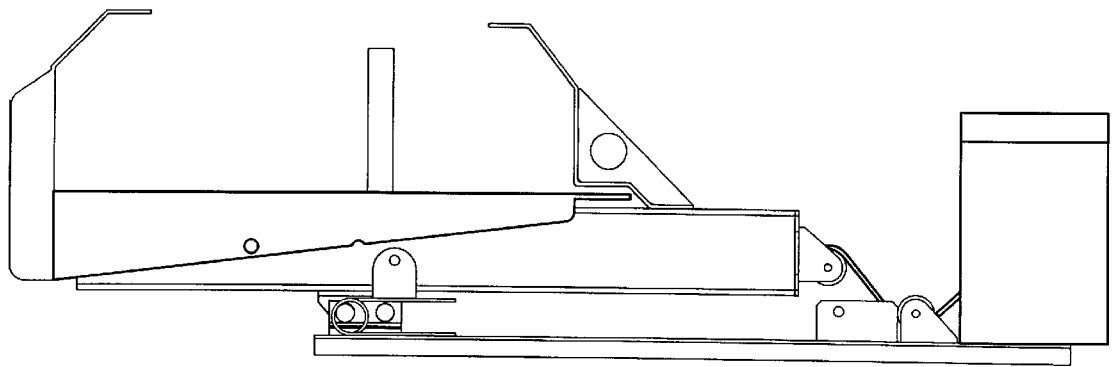
FIG._19
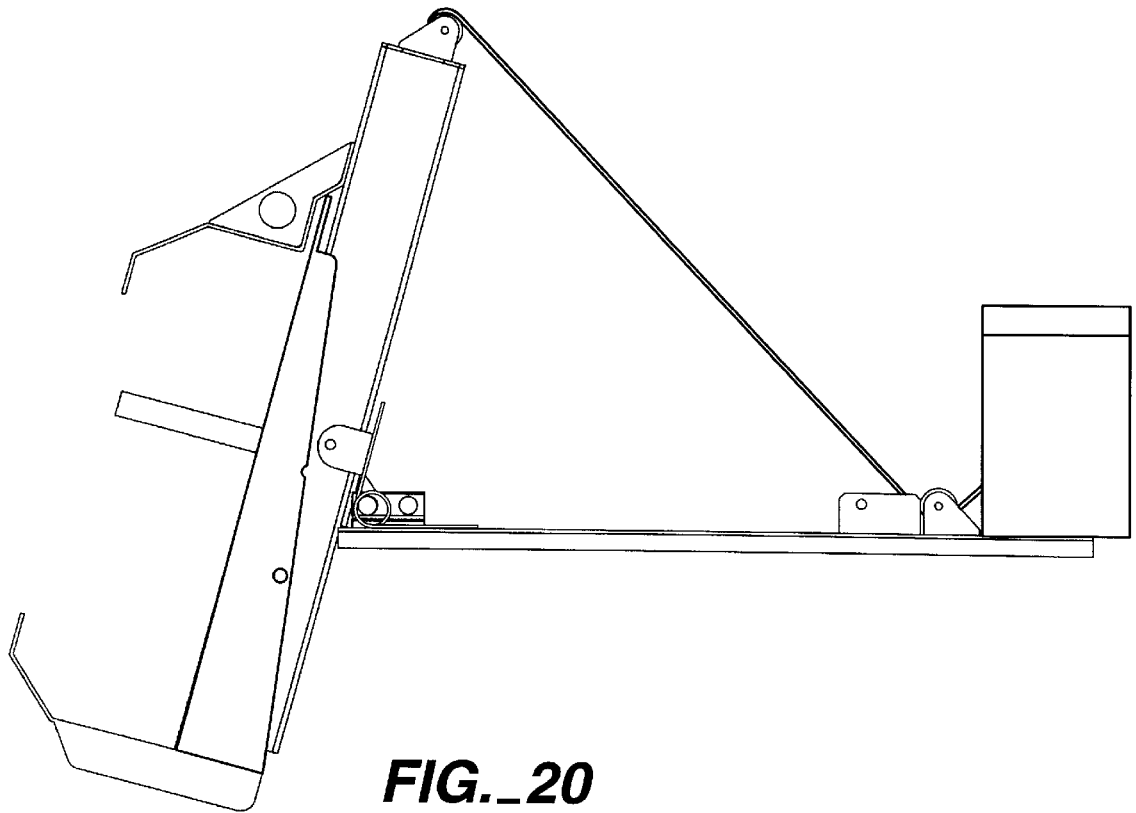
FIG._20

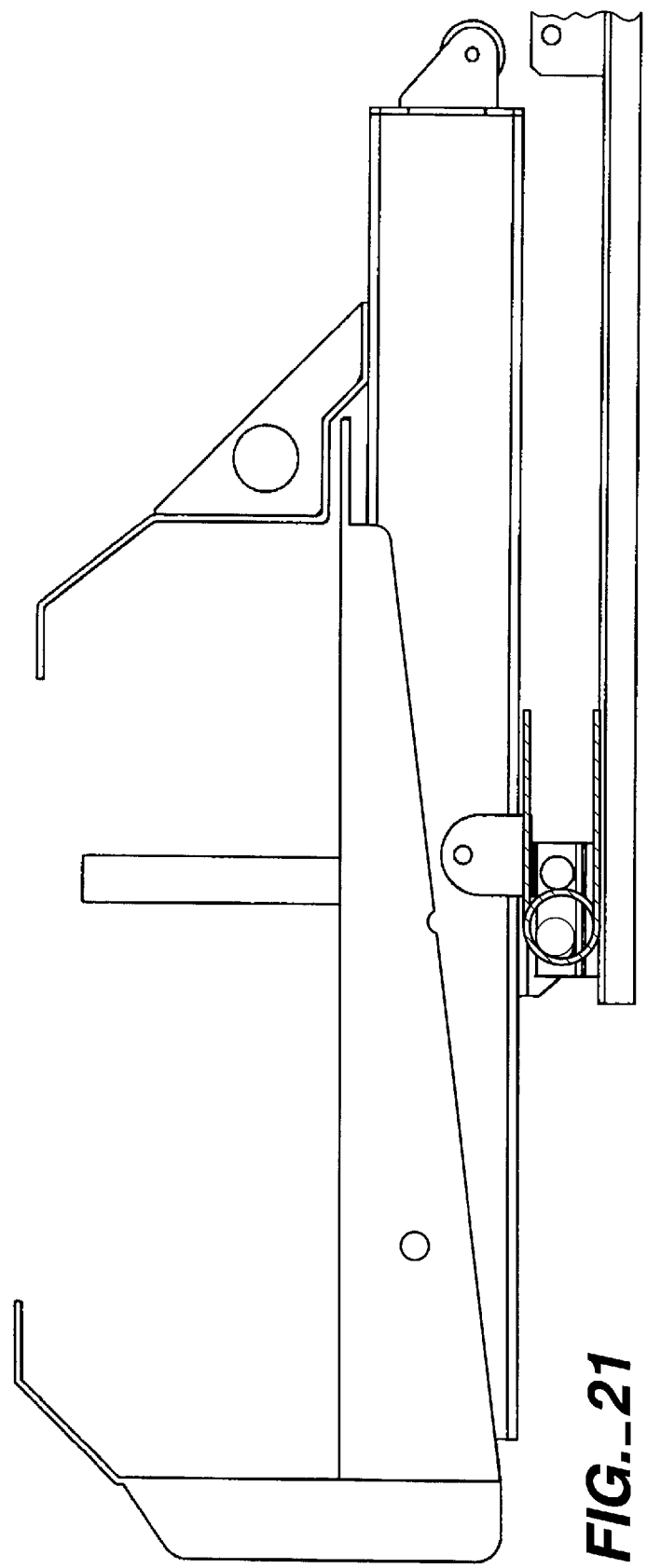
FIG._21

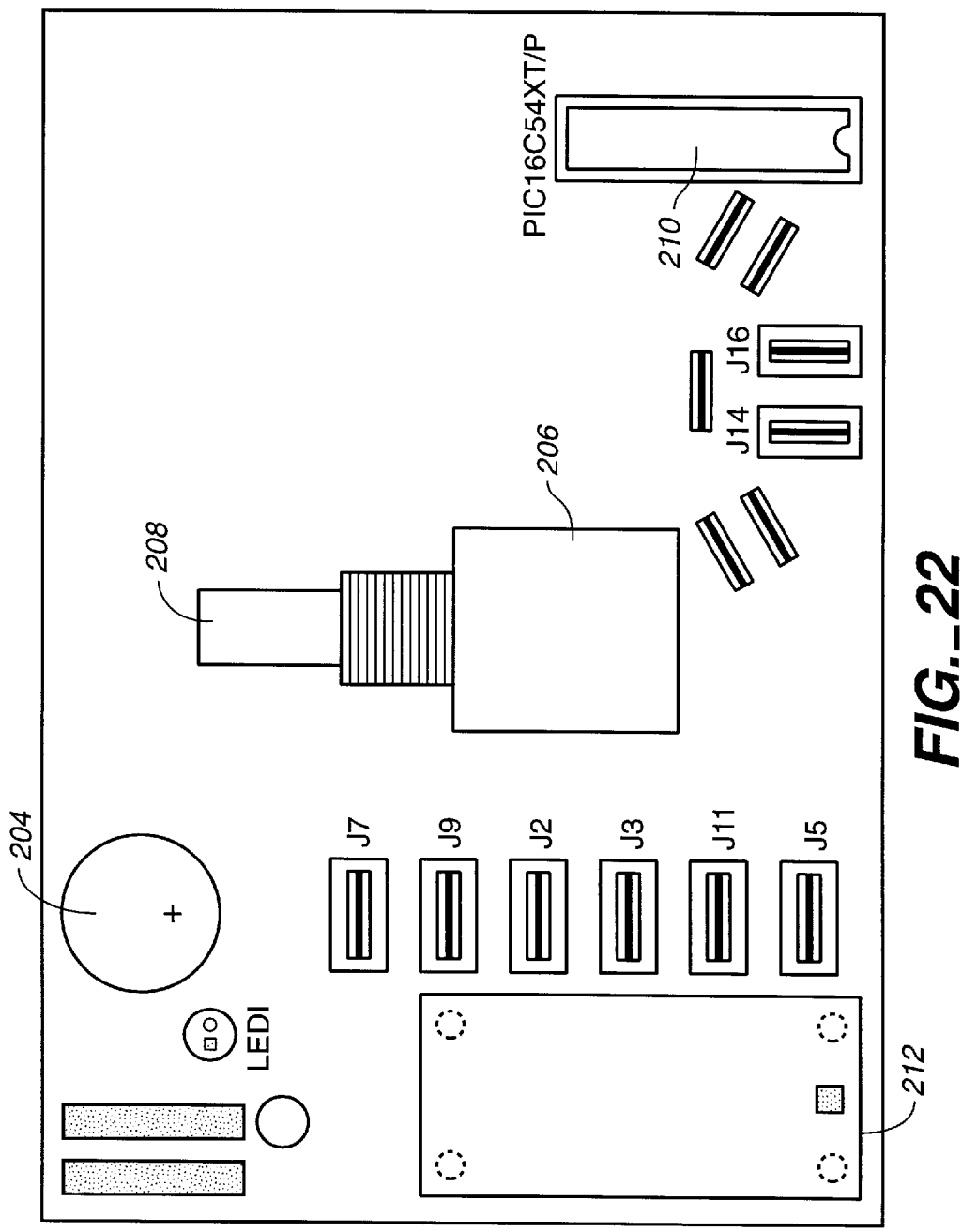

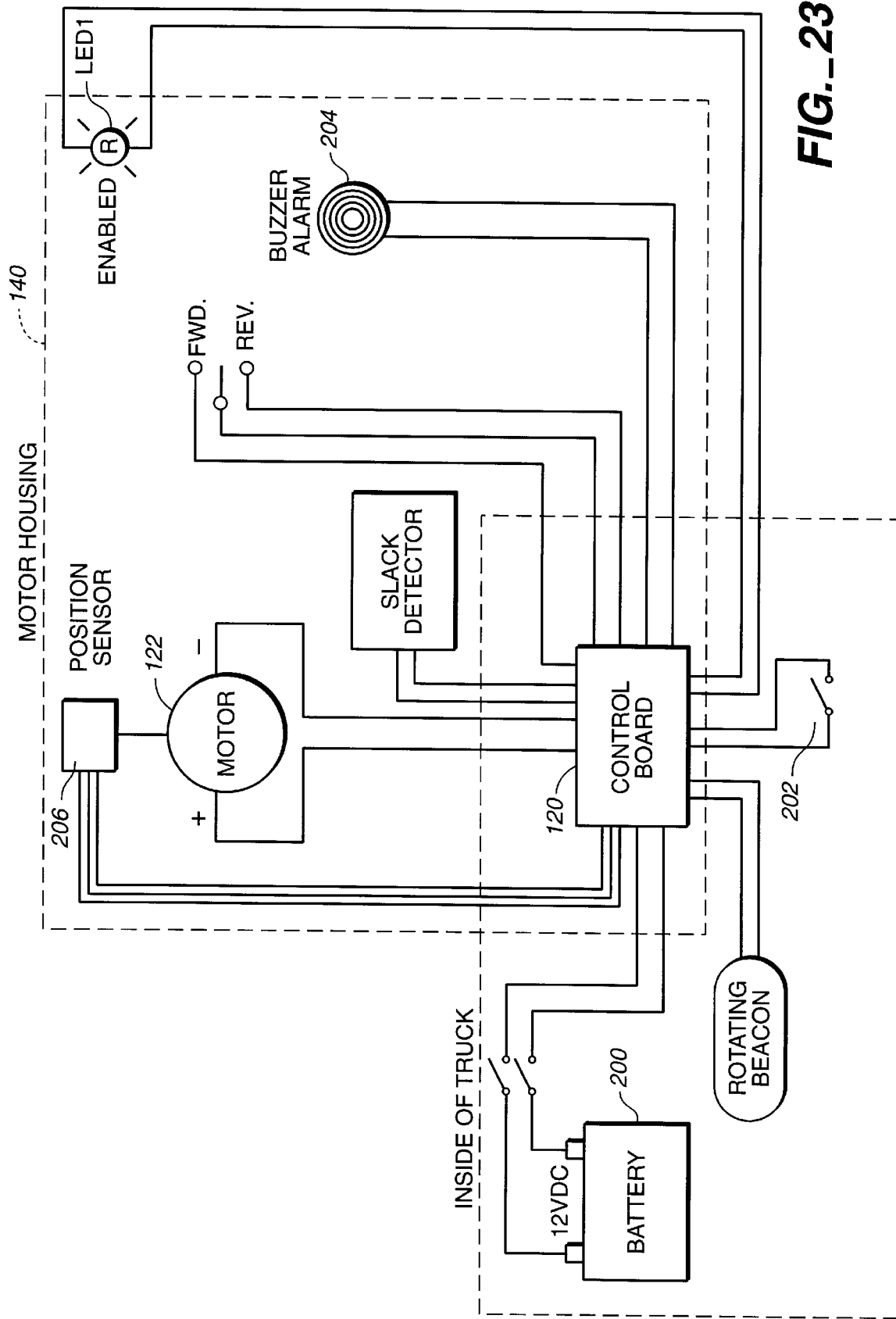

MOTORIZED RACK SYSTEM

BACKGROUND OF THE INVENTION

1. Field of the Invention

This invention relates to apparatus and methods for loading and unloading ladders and the like from ladder racks on vehicles.

2. Prior Art

Large pieces of equipment such as extension ladders are transported by service personnel for utility, telephone, and cable TV operators in fixed racks on the roofs of service vehicles, such as vans or trucks. Loading and unloading of ladders from these fixed racks requires awkward lifting of heavy, cumbersome ladders, which may result in damage to the vehicle or the ladder as well as strain or injury to a service person.

Consequently, the need has arisen for improved apparatus and methods for loading and unloading long items such as ladders from racks on vehicles.

SUMMARY OF THE INVENTION

It is therefore an object of the invention to provide improved apparatus and methods for loading and unloading ladders and the like from racks on vehicles.

In accordance with this and other objects of the invention, a vehicular ladder loader system for loading and unloading ladders from a rack on a vehicle is provided. The system includes a static rack for holding one end of a ladder and a pivoting and extendible rack for holding the other end of the ladder.

The static rack is mounted to the roof of a vehicle and has a pair of upwardly extending ladder grips, each of which is located near a respective side rail of the ladder near the one end of the ladder.

The system further includes a pivotable and extendible ladder rack assembly. The pivotable and extendible ladder rack assembly includes a base member mounted to the roof of a vehicle, an elongated pivoting member, and a slideable ladder carriage member. The elongated pivoting member is pivotably mounted to the base member and has an inboard ladder grip located at one end which is adapted for engagement with one side rail of the ladder at the other end of the ladder. The slideable ladder carriage member slideably extends from the other end of the elongated pivoting member. The slideable ladder carriage member at its outer, or distal, end has an outboard ladder grip mounted thereto which is adapted for engaging the other side rail of the ladder also near the other end of the ladder. The slideable ladder carriage member retracts into the elongated pivoting member such that the respective inboard and outboard ladder grips are spaced to engage the respective side rails of the ladder near the other end of the ladder. The slideable ladder carriage member is extendible from the pivoting member such that the respective inboard and outboard ladder grips can be spaced further apart than the width of the ladder.

The pivotable and extendible ladder rack assembly has a first locked-down, home position in which the elongated pivoting member is horizontally positioned on top of the vehicle and in which the slideable ladder carriage member is retracted into the pivotable slideable carriage member so that the ladder grip of the pivoting member and the ladder grip of the slideable ladder carriage member hold the ladder in a horizontal position on the roof of the vehicle.

The pivotable and extendible ladder rack assembly has a second fully-tilted, but not extended, position in which the elongated pivoting member is pivoted at an acute angle with respect to the base while the sliding member remains retracted into the pivoting member so that the ladder is held in position between the inboard and outboard ladder grips.

The pivotable and extendible ladder rack assembly has a third fully-tilted and extended position in which the elongated pivoting member is pivoted to extend at an acute angle with respect to the base and in which the slideable ladder carriage member is extended outwardly from the pivoting member so that the ladder rests against the outboard ladder grip of the slideable ladder carriage member and the ladder grips are spaced apart to permit removal from and placement on the slideable ladder carriage member of a ladder.

The system is provided with a mechanism for positioning the pivotable and extendible ladder rack assembly in the first locked-down position. A mechanism is provided for positioning the pivotable and extendible ladder rack assembly in the second fully-tilted, but not extended, position. A mechanism is provided for releasing the slideable ladder carriage member such that the pivotable and extendible ladder rack assembly assumes the third fully-tilted and extended position.

A cable is coupled to the one end of the pivoting member and a cable-spooling mechanism pays out and reels in the cable for positioning the motorized ladder rack assembly in the first locked-down position. The mechanism for positioning the motorized ladder rack assembly in the second fully-tilted position includes a biasing member which biases the pivotable slideable carriage member to the fully-tilted position. The mechanism for positioning the motorized ladder rack assembly in the second fully-tilted position also includes the cable-spooling mechanism for paying out the cable coupled to the pivoting member. In one embodiment of the invention, the biasing member includes one or more pneumatic struts.

The mechanism for positioning the motorized ladder rack assembly to the third fully-tilted and downwardly-telescoped position includes the cable and the cable-spooling mechanism for further paying out the cable.

The cable-spooling mechanism includes a spool driven by a reversible motor. A cable tension sensor senses reduced tension in the cable and disables the motor in response to reduced tension in the cable. The cable tension sensor includes a spring-loaded pivotable lever arm having an idler roller at one end for contacting the cable and a stop member at the other end for interrupting a photocell when the cable tension is reduced.

A safety latch mechanically locks the one end of the elongated pivoting member to the base when the motorized ladder rack assembly is in the first locked-down, home position. The safety latch includes a spring-loaded hook which is connected to a cable connected to a mechanically positioned control member. The mechanically positioned control member includes a rotatable spring-loaded, center-positioned control member with a wiper attached thereto which interrupts a photocell coupled to a controller for the motor.

The mechanism for positioning the motorized ladder rack assembly to the first locked-down position includes a shaft encoder connected to the motor for sensing rotation of the pulley, an integrated circuit controller which senses the length of the cable and remembers the home position (as indicated with a green LED) and shuts off the system after 30 second timeouts, a relay which switches the motor polarity at the end of a cycle, and d) an audible signal which sounds during operation.

The upwardly extending ladder grips of the static rack extend forwardly and sidewardly at angles with respect to vertical.

The slideable ladder carriage member includes a telescoping member which telescopes into the pivotable slideable carriage member. The slideable ladder carriage member has a stop post adapted to prevent the ladder from sliding fore and aft with respect to the vehicle.

The invention provides a method of loading a ladder on a vehicle including the steps of: engaging respective side rails of a ladder near one end of the ladder with a static rack having a pair of upwardly extending ladder grips; holding the other end of the ladder in a first locked-down home position with a slideable carriage member which is slideably mounted to an elongated pivoting member which is horizontally positioned on top of a vehicle and which is retracted into the elongated pivoting member; gripping the one side of the other end of the ladder with an inboard ladder grip mounted to the elongated pivoting member and gripping the other side of the other end of the ladder with an outboard ladder grip mounted to the slideable carriage member so that an outboard ladder grip distal end of the slideable carriage member is in its closest position with respect to an inboard ladder grip on the elongated pivoting member so that the ladder grips are holding the ladder in a horizontal position on the roof of the vehicle; pivoting the elongated pivoting member from the first locked-down home position to a second fully-tilted, but not telescoped, position in which the elongated pivoting member is pivoted to extend at an acute angle with respect to horizontal while the slideable carriage member remains retracted into the elongated pivoting member so that the ladder is tilted with respect to horizontal and the inboard and outboard ladder grips remain holding the other end of the ladder; and extending the slideable carriage member from the second position downwardly to a third fully-tilted and downwardly-telescoped position in which the pivoting slideable carriage member remains pivoted to extend at an acute angle with respect to horizontal and the slideable carriage member is extended downwardly and outwardly from the other end of the pivotable slideable carriage member so that the ladder grip at the first end of the pivotable slideable carriage member is in its farthest position with respect to the ladder grip of the sliding member so that the inboard ladder grip is located away from the other end of the ladder to release the ladder for removal.

The method further includes the steps of biasing the pivotable slideable carriage member toward the fully-tilted position; biasing the pivotable slideable carriage member toward the fully-tilted position with a pneumatic strut; and releasing a cable connected to the first end of the pivotable slideable carriage member to release the pivotable slideable carriage member from the first locked-down position.

The step of extending the slideable carriage member from the second position downwardly to a third fully-tilted and downwardly-telescoped position includes extending the sliding member to and from the second fully-tilted, but not telescoped, position to the third fully-tilted and downwardly-telescoped position using a cable connected at one end to the slideable carriage member.

The step of holding the other end of the ladder in a first locked-down home position includes the step of positioning the motorized ladder rack assembly in the first locked-down position using a cable coupled to the one end of the pivoting member and a cable-spooling mechanism for paying out and reeling in the cable.

The step of pivoting the elongated pivoting member from the first locked-down home position to a second fully-tilted, but not telescoped, position includes biasing the pivotable slideable carriage member to the fully-tilted position using a pneumatic strut and paying out the cable coupled to the pivoting member using a cable-spooling mechanism.

The step of extending the slideable carriage member from the second position downwardly to a third fully-tilted and downwardly-telescoped position includes further paying out the cable using the cable-spooling mechanism.

The step of controlling the cable with a reversible motor, sensing tension in the cable, and disabling the motor in response to reduced tension in the cable. The step of sensing cable tension sensor includes contacting the cable with an idler roller at one end of a spring-loaded pivotable lever arm having and having a stop member at the other end of the spring-loaded pivotable lever for interrupting a photocell when the cable tension is reduced.

The method further includes mechanically locking the one end of the elongated pivoting member to the base with a safety latch in the first locked-down home position. One embodiment of the safety latch includes a spring-loaded hook which is connected to a cable connected to a mechanically-positioned control member.

The method further includes the step of rotating the mechanically positioned control member to position a wiper attached thereto to interrupt a photocell coupled to a controller for the motor.

The method further includes sensing rotation of the pulley with a shaft encoder connected to the motor and sensing the length of the cable with an integrated circuit controller which remembers the home position. The system is shut off after a predetermined time period, such as 30 seconds. A relay is provided for switching the motor polarity at the end of a cycle. An audible alarm signal sounds during operation of the system.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A is a perspective view of a motorized rack system having a stationary rack on the front roof of a service van and a motorized rack shown in a locked-down position on the rear roof of the top of the van.

FIG. 1B is a perspective view of the motorized rack system shown in a fully-tilted, but not telescoped, position on top of the van.

FIG. 1C is a perspective view of the motorized rack system shown in a fully-tilted and downwardly telescoped position for loading and unloading of a ladder to and from the rack system on the side of the van.

FIG. 2 is a perspective view of a stationary rack.

FIG. 3 is a perspective view of a motorized rack.

FIG. 4 is an exploded perspective view of a motorized rack.

FIG. 5 is a perspective view of a slideable ladder carriage member assembly.

FIG. 6 is an exploded, perspective view of a base member assembly and some of the components mounted thereto.

FIG. 7 is an exploded, perspective view of an elongated pivoting member assembly.

FIG. 8 is an exploded, perspective view of some of the elements of a cable control assembly.

FIG. 9 is a partially exploded, perspective view of a cable control assembly.

FIG. 10 is a partially sectional, top view of a cable spool.

FIG. 11 is an exploded side view of a cable tension assembly.

FIG. 12 is a partially sectional view of a cable control assembly including a motor and gear box.

FIG. 13 is another partially sectional view of a cable control assembly.

FIG. 14 is a side elevation view of a motorized rack system in a locked-down position.

FIG. 15 is a side elevation view showing the elongated pivoting member assembly in the fully-tilted, but not telescoped, position.

FIG. 16 is a side elevation view showing the elongated pivoting member assembly in the fully-tilted and downwardly telescoped position.

FIG. 17 is a side elevation view of a motorized cable control assembly.

FIG. 18 is a plan view of a motorized rack including the cable control assembly.

FIG. 19 is a side elevation view of a motorized rack system with a torsion spring in a locked-down position.

FIG. 20 is a side elevation view of a motorized rack system with a torsion spring in a fully-tilted, but not telescoped, position.

FIG. 21 is an enlarged side elevation view of a motorized rack system with a torsion spring in a locked-down position.

FIG. 22 is a plan view of a printed circuit controller card for a motorized rack system.

FIG. 23 is an electrical block diagram for a controller printed-circuit board for a motorized rack system.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIGS. 1A, 1B, and 1C illustrate two principle components of a vehicular ladder loading system according to the invention mounted on the roof of a vehicle, such as a service van 10. One of these components is a static, or stationary, rack 12 and the other component is a pivotable and extendible ladder rack assembly, or motorized rack 14.

FIG. 1A illustrates a typical ladder section 16 mounted in a locked-down position on the roof of the van 10. The ladder 16 may be a one-piece design, as shown, an extension ladder with one or more extension sections, or a step ladder. The ladder 16 includes a pair of elongated side rails, designated as an outer side rail 18 and an inner side rail 19, between which extend a number of ladder rungs, typically shown as 20. It should be appreciated that other kinds of ladders or other types of elongated or bulky equipment may also be used with the present invention.

The static rack 12 is fixed to the front end of the roof of the van 10 with a number of techniques, including bolts and self-locking nuts (not shown) and auxiliary mounting brackets (not shown) suitable for a particular van or vehicle design.

FIG. 2 shows the static rack 12 in more detail. The static rack 12 is typically formed as an elongated tube member 30 which is fixed to a mounting channel 32. The mounting channel 32 is appropriately attached to the roof of a vehicle such as the van 10. The tube member 30 has pair of upwardly and outwardly extending horns, or ladder guides 32, 33 formed at each end, as illustrated, to assist in loading and unloading of a ladder. As illustrated in FIGS. 1A–1C, the horns 32, 33 are each adapted to be at one end of the ladder near a respective outer or inner side rail 18, 19 of the ladder 16. An upwardly extending ladder stop bracket 34 is attached to the mounting channel 30 to engage a rung of the ladder and prevent the ladder from sliding forward or backward. A cable 36 for securing the ladder has one end fixed to the mounting channel and the other end formed into a loop for padlocking the ladder to the vehicle, if desired. A plastic boot 38 is fixed to the ladder stop bracket and plastic wear pads 40, 41 are fixed to the surfaces of the horns 32, 33 and the tube member 30, as illustrated.

FIG. 3 shows in perspective the pivotable and extendible ladder rack assembly, or motorized rack, which is mounted near the rear end of the roof of the van 10. The pivotable and extendible ladder rack assembly 14 includes a base member 50, which is fixed to the roof of the vehicle 10. The pivotable and extendible ladder rack assembly 50 also includes an elongated pivoting member 52 which is pivotably mounted near the outer end of the base member 50. The elongated pivoting member 52 has an inboard ladder grip 54 on its inboard side. The inboard ladder grip 54 is shaped to have an upper end 56 which is adapted to overlie the inner side rail 17 of the ladder 16.

A slideable ladder carriage member 60 slideably extends out of and also retracts into the outboard end of the elongated pivoting member 52, as discussed and illustrated in more detail herein below. At the distal, or outer, end of the slideable ladder carriage member 60 is located an outboard ladder grip 62. The outboard ladder grip 32 is also shaped to have an upper end 64 which overlies the outer side rail 18 of the ladder 16. When the slideable ladder carriage member 60 is retracted into the elongated pivoting member 52, the inboard and outboard ladder grips 54, 62 are spaced relatively closer together to engage the respective inner and outer side rails 18, 17 of the ladder in order to secure the back end of the ladder 16 in position on the rear roof of the vehicle 10. As discussed herein below, when the slideable ladder carriage member 60 is extended from the pivoting member 52, the respective inboard and outboard ladder grips 54, 62 are spaced further apart than the width of the ladder 16 to allow the back end of the ladder to be released from or loaded onto the slideable ladder carriage member 60. The slideable ladder carriage member 60 also has a post 66 fixed thereto for also preventing the ladder from sliding forward or backward.

FIGS. 1A, 1B, and 1C also illustrate various operational positions of an exemplary vehicular ladder unloading/loading system according to the invention.

FIG. 1A shows the pivotable and extendible ladder rack assembly 14 in a first locked-down, or home position in which the elongated pivoting member 52 is horizontally positioned on the roof of the vehicle 10. In this position, the slideable ladder carriage member 60 is retracted into the pivotable slideable carriage member 52 so that the inboard ladder grip 54 on the pivoting member 52 and the outboard ladder grip 62 on the slideable ladder carriage member 60 both grip the rear end of the ladder 16 and hold the ladder 16 in a substantially horizontal position on the roof of the vehicle 10, as illustrated. The front end of the ladder 16 horizontally rests in the static rack 12 near the front end of the van 10, as illustrated.

FIG. 1B shows the pivotable and extendible ladder rack assembly 14 in a second fully-tilted, but not extended, position in which the elongated pivoting member 52 is pivoted up at an acute angle with respect to the generally horizontal base 50. In this position, the sliding member 60 remains retracted into the pivoting member 52 so that the rear end of the ladder 16 is held between the inboard and outboard ladder grips 54, 62 in a tilted position. In this position, the rear end of the outer rail 18 of the ladder 16 is slightly below the roof of the van, as illustrated. The front end of the ladder is also tilted in the stationary rack 12 so that the far end of the side rail 18 rests against the static rack 12, as illustrated. In this position, the long axis of the ladder 16 is inclined at a small angle with respect to horizontal, as illustrated.

FIG. 1C shows the pivotable and extendible ladder rack assembly 14 in a third fully-tilted and extended position in which the elongated pivoting member 52 remains pivoted at the acute angle with respect to the base 50 and in which the slideable ladder carriage member 60 is also telescopically extended downwardly and outwardly from the pivoting member 52 so that the ladder 16 rests against the outboard ladder grip 32 of the slideable ladder carriage member 60. In this position, the ladder grips 54, 62 are spaced apart more than in the first and second positions to permit an operator to remove or place the ladder 16 in or out of the slideable ladder carriage member 28, as illustrated. Note that in the third position, the outer rail 18 of the ladder 16 rests on the outboard ladder grip and remains at an acute angle less than ninety degrees. The acute angle allows the ladder 16 to clear the side of the vehicle and also causes the tilted ladder to remain in the ladder carriage 28. In the third position, the rear end of the outer rail 18 of the ladder 16 is typically positioned three or four feet above the ground to facilitate loading and unloading of the ladder, as illustrated. In this position, the long axis of the ladder 16 is inclined at a greater angle with respect to horizontal with the side rail 18 at the front end of the ladder 16 resting against the static rack 12, as illustrated. The open structure provided by the horns 32, 33 of the static rack 12 allows the front end of the ladder 16 to pivot and remain supported by the rack.

As illustrated in FIG. 3 and in an exploded form in FIG. 4, the pivotable and extendible ladder rack assembly, or motorized rack, 14 includes a base member 50 which is mounted to the rear roof of the van 10 using a number of techniques, including bolts and self-locking nuts and auxiliary mounting brackets (not shown) appropriate for a particular van or vehicle design. The base member 50 is formed as an elongated aluminum extrusion having a number of longitudinally extending T-grooves (typically shown as 70) formed into its upper and lower surfaces. The T-grooves are designed to hold captive the heads of mounting bolts (not shown) for various components mounted to the base member 50 and for mounting the base member 50 to the roof of the van. The T-grooves allow for longitudinal adjustment of the location of the captive mounting bolt heads.

A pair of lower pivot brackets 72, 73, each with an upstanding ear, are mounted to the base 50. An upper pivot bracket 74 also with a pair upstanding ears is similarly mounted to the lower side of the square aluminum extrusion forming the elongated pivoting member 52 using T-grooves formed in the extrusion. A pivot rod 76 extends through corresponding bushings in holes formed in the ears of the lower pivot brackets 72, 73 and the upper pivot bracket 74. This arrangement pivotably mounts the elongated pivoting member 52 near the outer end of the base member 50.

The elongated pivoting member 52 is formed as a square, hollow aluminum extrusion with the inboard ladder grip 54 fixed to its top side near the inside end. The inboard ladder grip 54 is an upwardly extending aluminum strap which is strengthened with a gusset and which has one end fixed to the inner end of the elongated pivoting member. The free other end of the inboard ladder grip is adapted to engage with the inner side rail of the ladder.

The slideable ladder carriage member 60 is mounted to slideably extend from the outboard end of the elongated pivoting member 26. The slideable ladder carriage member 60 includes an inside channel member 80 which slides on a pair of extendible drawer slides 82, 83 mounted between the interior surfaces of the square aluminum extrusion 52 and the outside lateral surfaces of the inside channel member 80. A cantilevered ladder carriage 84 is formed as a U-shaped channel from a sheet of aluminum with its sides fixed to the sides of the inside channel 80. The outboard ladder grip 62 is fixed to the distal end of the inside channel 80. The outboard ladder grip 62 is also shaped to have an end 54 which also overlies the outer side rail of a ladder.

FIG. 5 shows details of the components of the slideable ladder carrying member 60.

As illustrated in connection with FIGS. 3 and 4, a cable 90 has one end attached to the inboard end of the inside channel 80 of the slideable ladder carriage member 60. The cable 62 passes through the pivoting member 52, through a hole in an end cap 92 fixed to the inboard end of the pivoting member 26, and through a pulley 94 fixed to the end cap. The cable 90 also passes around a pulley 96 fixed to the base 50. The weight of the slideable ladder carriage member 60 and the weight of a ladder extends the slideable ladder carriage member 60 out and away from the pivoting member 52. The cable 90 is also used to retract the slideable ladder carriage member 60 into the pivoting member 52.

In the retracted position, the inside channel 80 of the slideable ladder carriage member 60 retracts partially into the elongated pivoting member 52 so that the inboard and outboard ladder grips 54, 62 are spaced closer together to engage the respective side rails of the ladder to secure the rear end of the ladder 16 in position on the rear roof of the vehicle 10. The slideable ladder carriage member 60 is extended from the pivoting member 52 such that the respective inboard and outboard ladder grips 54, 62 can be spaced further apart than the width of the ladder 16 to release the ladder 16 for unloading.

A pair of pneumatic struts 98, 99 are mounted on each side of the base to provide a biasing force between the base member 50 and the elongated pivoting member 52 for biasing the pivotable member 52 toward a fully-tilted position.

As illustrated in FIGS. 3, 4, and 7, a bracket 100 with a pair of external ears is mounted to the pivoting member 52. One end of each pneumatic strut is pivotably fixed to one of the ears with a snap-on ball joint connection. The other end is similarly pivotably attached to respective upwardly extending ears on a locking bracket 102. A spring-loaded hooked locking latch is also mounted to the locking bracket 102 for engagement with the inner end of the pivoting member 52 to lock the pivoting member 52 in a locked-down horizontal position. The struts 98, 99 in their compressed or partially-compressed positions exert forces along their longitudinal axes. In the fully-tilted position the elongated pivoting member 52 is pivoted at an acute angle with respect to the horizontally positioned base 50. The angle of the pivoting member is less than ninety degrees to allow a ladder to clear the side of a vehicle and also to have the ladder be tilted enough so that it remains in the ladder carriage 28.

With reference to FIGS. 3 and 4, the cable 90 for raising and lowering the ladder carriage has one end fixed to the inboard end of the inside channel. The cable passes through the pivoting member 52, through a hole in the end cap 92 fixed to the inboard end of the pivoting member 52, through a pulley 94 fixed to the end cap, and through the pulley 96. When the pivoting member 52 is in the fully tilted position, the weight of the slideable ladder carriage member assembly 60 and the weight of a ladder 16 extend the slideable ladder carriage member assembly 28 from the pivoting member 26 as the cable is precisely spooled out by a motor. The cable 90 is also used to retract the slideable ladder carriage member assembly into the pivoting member.

FIG. 8 shows the safety latch arrangement which is provided for mechanically locking the inboard end of the elongated pivoting member 52 to the base 50 when the motorized ladder rack assembly is in the first locked-down, home position. The safety latch includes the spring-loaded hook 104 which is connected to one end of a release cable 106. The release cable is pulled to release the hook 72. The other end of the release cable 74 is connected to a mechanically positionable control member 110.

Both the cable 90 and the release cable 106 go into a motor control unit 120 illustrated in FIGS. 3, 4, 8, 9, 10. The mechanically positionable control member 110 is spring-loaded and mounted for rotation to a motor cover base 112. An operator control lever 114 rotates the control member 110. The control lever 114 is center-positioned with springs and is rotated to pull the cable 106 and to release the spring-loaded hook 104 from the inboard end of the pivoting member 52. A wiper 116 is attached to the control member 110 so that, when the control member 114 is rotated to one position, the wiper 116 interrupts a light beam in a first photocell sensor 118 when the control member is rotated to the other position; the wiper 116 interrupts another light beam in a second photocell sensor 118b. Both sensors 188a, 188b are mounted on the lower side of a printed circuit control card 120 which is provided to control a reversible actuator motor 122.

The reversible DC motor 122 is connected to a gear box 124. The actuator motor 122 and gear box 124 is commercially provided, for example, as a United Technology Motor System Part No. M027RM. An output shaft of the gear box 124 is connected through a coupler 126 to a spool shaft 128. The spool shaft 128 is rotatably mounted on bearings 130, 131 to a spool-and-motor bracket mounting assembly 132. A take-up spool 134 has one end of the cable 90 connected to it by capturing a ball crimped to the end of the cable in a keyhole slot 136 formed in the surface of the spool, as illustrated in FIG. 10. The printed circuit control card 120 is also mounted on brackets fixed to the spool-and-motor bracket mounting bracket 132.

FIGS. 8, 9, 11, 12, and 13 illustrate a tension sensor assembly 140 which senses reduced tension in the cable 90 and disables the motor 122 in response to reduced tension in the cable. The tension sensor assembly 140 includes an upright frame 142 which is mounted to the motor cover base 112. A spring-loaded pivotable lever arm 144, biased at its top end by a spring 146, is pivotably mounted to the frame 142. A roller 148 is mounted to the other, lower end of the lever arm 144 for contacting the cable 90. A photocell sensor 150, shown in FIG. 20, is mounted to the frame 142 and a flag 152 at the top end of the lever arm 124 interrupts a light beam in the photocell sensor to stop the motor when the cable tension is reduced, for example, or when the ladder carriage not moving for some reason.

A motor cover assembly 160 shown in FIGS. 4 and 9 includes a motor cover 162, a front side 164, a rear side 166 which are welded together and attached to the base 112 with appropriate fasteners. A slot 148 is provided between the cover 142 and the base 82 for the control lever 84. A slot 150 is provided in the front side 144 for the release cable 74 for the spring-loaded hook 72. Another slot 152 is provided in the front side 144 for the cable 62.

The cable 62 is controlled with the reversible motor 100. Tension in the cable is sensed with the tension sensor assembly 120 and the motor 100 is disabled in response to reduced tension in the cable. Sensing of cable tension includes contacting the cable with an idler roller at one end of a spring-loaded pivotable lever arm having and having a stop member at the other end of the spring-loaded pivotable lever for interrupting the photocell when the cable tension is reduced and stopping the motor.

In operation, one end of the elongated pivoting member to the base with a safety latch in the first locked-down home position using a spring-loaded hook which is connected to a cable connected to a mechanically-positioned control member. The mechanically positioned control member is rotated to position a wiper attached thereto to interrupt a photocell coupled to a controller for the motor. The apparatus is used for sensing rotation of the pulley with a shaft encoder connected to the motor, sensing the length of the cable with an integrated circuit controller which remembers the home position (as indicated with a green led) and shutting off the system after 30 second timeouts. A relay switches the motor polarity at the end of a cycle, d) an audible signal sounds during operation.

FIGS. 14, 15 and 16 illustrate some of the steps in a method for unloading and loading a ladder on a vehicle. As previously described in connection with FIG. 1A, the method includes engaging respective side rails of the ladder 16 near one end of the ladder with a static rack 12 having a pair of upwardly extending ladder grips.

FIG. 14 illustrates the step of holding the other end of the ladder 16 in a first locked-down home position with the slideable carriage member which is slideably mounted to an elongated pivoting member which is horizontally positioned on top of a vehicle and which is retracted into the elongated pivoting member. FIG. 13 further illustrates the step of gripping the one side of the other end of the ladder with an inboard ladder grip mounted to the elongated pivoting member and gripping the other side of the other end of the ladder with an outboard ladder grip mounted to the slideable carriage member so that an outboard ladder grip on the distal end of the slideable carriage member is in its closest position with respect to an inboard ladder grip on the elongated pivoting member so that the ladder grips are holding the ladder in a horizontal position on the roof of the vehicle. The motorized ladder rack assembly is held in the first locked-down position using the cable 62 coupled to the one end of the pivoting member and the cable-spooling mechanism for reeling in the cable against the biasing force provided by the pneumatic shock members 60, 61. In this first position, the pneumatic struts 60, 61 are compressed and bias the pivotable slideable carriage member 26 toward pivoting around the pivot pin 46 at the outside end of the base 24 while the cable 62 and the safety latch assembly 70, when engaged, hold the inboard end of the elongated pivoting member 26 close to the base 24 in a horizontal position.

FIG. 17 and 18 shows a plan view of the motorized rack in the locked-down position with the pneumatic struts 60, 61 compressed.

FIG. 15 illustrates the step of pivoting the elongated pivoting member from the first locked-down home position to a second fully-tilted, but not telescoped, position in which the elongated pivoting member is pivoted to extend at an acute angle with respect to horizontal while the slideable carriage member is remains retracted into the elongated pivoting member so that the ladder is tilted with respect to horizontal and the inboard and outboard ladder grips remain holding the other end of the ladder. The pivotable slideable carriage member is pivoted to the fully-tilted position using the forces of the pneumatic struts 60, 61 as the cable 62 is paid out from the cable-spooling mechanism.

FIG. 16 illustrates the step of extending the slideable carriage member from the second position downwardly to a third fully-tilted and downwardly-telescoped position in which the pivoting slideable carriage member is pushed by the extended pneumatic struts 60, 61 to remain pivoted at an acute angle with respect to horizontal. In the third position, the slideable carriage member 28 is extended downwardly and outwardly from the other end of the pivoting member 26 so that the ladder grip 32 at the first end of the pivotable slideable carriage member 28 is in its farthest position with respect to the ladder grip 30 of the sliding member to allow loading or unloading of a ladder. The weight of the carriage member 28 and the weight of a ladder 16 are used to extend the slideable ladder carriage member assembly 28 from the pivoting member 26 as the cable 62 is spooled out using the cable-spooling mechanism.

FIG. 22 is an electrical schematic diagram for a motorized ladder rack assembly. FIG. 22 shows an electrical schematic diagram which illustrates the interconnections between the various elements of the system for providing electronic control of the motorized ladder rack assembly. Note that this preferred embodiment of an electronic control system uses no external limit switches or sensors to control the position of the motor in order to eliminate any malfunctions due to exposure of such external limit switches or sensors. Most of the electrical and electronic components are contained within the motor cover assembly.

FIG. 23 is a plan view of a controller circuit card. FIG. 23 shows the layout of the controller circuit card, or control board 120, which is mounted to brackets fixed to the spool-and-motor bracket mounting assembly 132.

Terminals J2 and J3 on the control board 120 are connected through appropriate wiring to a 12 volt battery 200 to provide power to the various electrical and electronic components. Terminals J14 and J16 of control board 120 are connected through appropriate wiring to a momentary push button 202 which is located within the van and operated with a key or button to enable the electrical and electronic systems for a preset period of time.

The control board 120 and the motor 122 are located within the motor cover assembly. Terminals J5 and J7 of the control board 120 are connected through appropriate wiring to terminals of the motor 122, which is a reversible DC motor. Terminals J9 and J11 of the control board 120 are connected through appropriate wiring to terminals of a buzzer alarm 204 which provides an audible alert signal during operation of the system.

A shaft encoder, or position sensor, 206 is mounted to the control board 120. An input shaft 208 of the shaft encoder is connected through the spool shaft to the motor 100. A reversing relay 210 sets the system for raising or lowering the ladder carriage by changing motor polarity at the end of a cycle. The shaft encoder is used with an integrated circuit controller 210 to sense the position of the ladder carriage member by providing rotation information for the takeup spool 134. This rotation information is then used to sense the length of the cable paid out and, hence the position of the ladder carriage member 60. This system also remembers the home position. A green light-emitting diode LED1 mounted on the control board 120 is lit to indicate that the system is in the home position. A 30 second timeout routine shuts off the system after 30 seconds of operation. A forward/reverse function is provided by the flag 116 on the control 110 to control the direction of rotation of the motor A relay 210 switches the motor polarity at the end of a cycle.

With reference to FIGS. 22 and 23, the microprocessor 210 is programmed to perform various functions by receiving and storing information from the position sensor encoder 206 about the cable being spooled.

The momentary pushbutton switch 202 is located inside the vehicle and no circuit breaker is utilized. The operator pushes the button 202 once to enable or arm the ladder rack electronic system to move the ladder up or down. This button 202 also functions as a system reset.

The sequence of operation is as follows: The operator opens the truck and pushes the button 202 to arm the ladder rack system. The operator has 60 seconds, for example, to start using the control lever 114. If the ladder is moved to the fully extended position, the control unit shuts itself down in five seconds. If the ladder moves to the fully retracted position and is latched down, the control unit shuts itself down in five seconds. Alternatively, if the control unit using the position sensor encoder 206 senses no activity of the operators control lever 114 for one minute, the control unit shuts itself down. The control system is reactivated by pressing the reset button 202. If the control unit senses slack cable short of the fully-extended position, the unit will emit an audio alarm and prevent further extension. The system permits retraction if the slack detector senses slack cable. After 60 seconds, the control unit shuts down.

If the control unit is retracting or extending and senses no movement with the position sensor encoder 206 (i.e., a jam), the unit emits an audio alarm and prevents further retraction until the operator extends the ladder, or pushes the button to reset the control unit. This requires the operator to clear the jam condition before he can move the ladder. After 60 seconds, the control unit shuts down. Once the control unit shuts down, the operator must push the button 202 to re-arm the ladder rack control system. With no circuit breaker, the control unit provides overcurrent protection for the motor by shutting down the system and power to the motor upon sensing no movement. The relay 210 reverses the polarity of the voltage to the motor 122 to raise or lower the ladder carriage, depending upon the position of the control lever 114. The wiper 116 activates photocell sensors 118a, 118b to raise or lower the ladder carriage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the Claims appended hereto and their equivalents.

We claim:

1. A vehicular ladder delivery system, comprising:
   a static rack mounted to the roof of a vehicle, wherein the static rack has a pair of upwardly extending ladder grips each of which is located near a respective side rail of a ladder near one end of the ladder;
   a pivotable and extendible ladder rack assembly including:
     a base member mounted to the roof of a vehicle;
     an elongated pivoting member;
     a slideable ladder carriage member;
     wherein the elongated pivoting member is pivotably mounted to the base and wherein the elongated pivoting member has an inboard ladder grip, which is located at one end of the elongated pivoting member and which is adapted for engagement with one side rail of the ladder near the other end of the ladder;
     wherein the slideable ladder carriage member slideably extends from the other end of the elongated pivoting member and wherein the slideable ladder carriage member at its distal end has an outboard ladder grip mounted thereto and also adapted for engaging the other side rail of the ladder near the other end of the ladder;
     wherein the pivotable slideable carriage member retracts into the elongated pivoting member such that the respective inboard and outboard ladder grips are spaced to engage the respective side rails of the ladder near the other end of the ladder;
     wherein the slideable ladder carriage member is extendible from the pivoting member such that the respective inboard and outboard ladder grips can be spaced further apart than the width of the ladder;
     wherein the pivotable and extendible ladder rack assembly has a first locked-down, home position in which the elongated pivoting member is horizontally positioned on top of the vehicle and in which the slideable ladder carriage member is retracted into the pivotable slideable carriage member so that the ladder grip of the pivoting member and the ladder grip of the slideable ladder carriage member hold the ladder in a horizontal position on the roof of the vehicle;
     wherein the pivotable and extendible ladder rack assembly has a second fully-tilted, but not extended, position in which the elongated pivoting member is pivoted at an acute angle with respect to the base while the sliding member remains retracted into the pivoting member so that the ladder is held in position between the inboard and outboard ladder grips;
     wherein the pivotable and extendible ladder rack assembly has a third fully-tilted and extended position in which the elongated pivoting member is pivoted to extend at an acute angle with respect to the base and the slideable ladder carriage member is extended outwardly from the pivoting member so that the ladder rests against the outboard ladder grip of the slideable ladder carriage member and the ladder grips are spaced apart to permit removal from and placement on the slideable ladder carriage member of a ladder;
   a mechanism for positioning the pivotable and extendible ladder rack assembly in the first locked-down position;
   a mechanism for positioning the pivotable and extendible ladder rack assembly in the second fully-tilted, but not extended, position; and
   a mechanism for releasing the slideable ladder carriage member such that the pivotable and extendible ladder rack assembly assumes the third fully-tilted and extended position.

2. The ladder delivery system of claim 1 wherein the mechanism for positioning the pivotable and extendible ladder rack assembly in the first locked-down position includes a cable coupled to the one end of the pivoting member and a cable-spooling mechanism for paying out and reeling in the cable.

3. The ladder delivery system of claim 2 wherein the mechanism for positioning the pivotable and extendible ladder rack assembly in the second fully-tilted position includes a biasing member which biases the elongated pivoting member to the fully-tilted position and also includes the cable-spooling mechanism for paying out the cable coupled to the pivoting member.

4. The ladder delivery system of claim 3 wherein the biasing member includes one or more pneumatic struts.

5. The ladder delivery system of claim 3 wherein the mechanism for positioning the pivotable and extendible ladder rack assembly to the third fully-tilted and extended position includes the cable and the cable-spooling mechanism for further paying out the cable.

6. The ladder delivery system of claim 5 wherein the cable-spooling mechanism includes a spool driven by a reversible motor.

7. The ladder delivery system of claim 6 including a cable tension sensor for sensing reduced tension in the cable and disabling the motor in response to reduced tension in the cable.

8. The ladder delivery system of claim 7 wherein the cable tension sensor includes a spring-loaded pivotable lever arm having an idler roller at one end for contacting the cable and a stop member at the other end for interrupting a photocell when the cable tension is reduced.

9. The ladder delivery system of claim 7 including a safety latch for mechanically locking the one end of the elongated pivoting member to the base when the motorized ladder rack assembly is in the first locked-down, home position.

10. The ladder delivery system of claim 9 wherein the safety latch includes a spring-loaded hook which is connected to a cable connected to a mechanically positioned control member.

11. The ladder delivery system of claim 10 wherein the mechanically positioned control member includes a rotatable spring-loaded, center-positioned control member with a wiper attached thereto which interrupts a photocell coupled to a controller for the motor.

12. The ladder delivery system of claim 6 wherein the mechanism for positioning the motorized ladder rack assembly to the first locked-down position includes a shaft encoder connected to a motor for sensing rotation of a pulley, an integrated circuit controller which senses the length of the cable and remembers the home position and shuts off the system after 30 second timeouts, a relay switches the motor polarity at the end of a cycle, and an audible signal sounds during operation.

13. The ladder delivery system of claim 1 wherein the upwardly extending ladder grips of the static rack extend forwardly and sidewardly at angles with respect to vertical.

14. The ladder delivery system of claim 1 wherein the slideable ladder carriage member includes a telescoping member which telescopes into the elongated pivoting member.

15. The ladder delivery system of claim 1 wherein the slideable ladder carriage member has a stop post adapted to prevent the ladder from sliding fore and aft with respect to the vehicle.

16. A method of unloading a ladder from a vehicle, engaging respective side rails of a ladder near one end of the ladder with a static rack having a pair of upwardly extending ladder grips, comprising the steps of:

holding the other end of the ladder in a first locked-down home position with the slideable carriage member which is slideably mounted to an elongated pivoting member which is horizontally positioned on top of a vehicle and which is retracted into the elongated pivoting member;

gripping the one side of the other end of the ladder with an inboard ladder grip mounted to the elongated pivoting member and gripping the other side of the other end of the ladder with an outboard ladder grip mounted to the slideable carriage member so that an outboard ladder grip distal end of the slideable carriage member is in its closest position with respect to an inboard ladder grip on the elongated pivoting member so that the ladder grips are holding the ladder in a horizontal position on the roof of the vehicle;

pivoting the elongated pivoting member from the first locked-down home position to a second fully-tilted, but not telescoped, position in which the elongated pivoting member is pivoted to extend at an acute angle with respect to horizontal while the slideable carriage member is remains retracted into the elongated pivoting member so that the ladder is tilted with respect to horizontal and the inboard and outboard ladder grips remain holding the other end of the ladder; and extending the slideable carriage member from the second position downwardly to a third fully-tilted and downwardly-telescoped position in which the elongated pivoting member remains pivoted to extend at an acute angle with respect to horizontal and the slideable carriage member is extended downwardly and outwardly from the other end of the elongated pivoting member so that the ladder grip at the first end of the elongated pivoting member is in its farthest position with respect to the ladder grip of the slidable carriage member so that the inboard ladder grip is located away from the other end of the ladder to release the ladder for removal.

17. The method of claim 16 including the step of biasing the elongated pivoting member toward the fully-tilted position.

18. The method of claim 17 including the step of biasing the elongated pivoting member toward the fully-tilted position with a pneumatic strut.

19. The method of claim 18 including the step of releasing a cable connected to the first end of the elongated pivoting member to release the elongated pivoting member from the first locked-down position.

20. The method of claim 19 wherein the steps of extending the slideable carriage member from the second position downwardly to the third fully-tilted and downwardly-telescoped position includes extending the sliding member from the second fully-tilted, but not telescoped, position to the third fully-tilted and downwardly-telescoped position using the cable connected at one end to the elongated pivoting member.

21. The method of claim 17 wherein the step of holding the other end of the ladder in the first locked-down home position includes the step of positioning the elongated pivotihg member in the first locked-down position using a cable coupled to the one end of the pivoting member and a cable-spooling mechanism for paying out and reeling in the cable.

22. The method of claim 17 wherein the step of pivoting the elongated pivoting member from the first locked-down home position to the second fully-tilted, but not telescoped, position includes biasing the elongated pivoting member to the fully-tilted position using a pneumatic strut and paying out a cable coupled to the pivoting member using a cable-spooling mechanism.

23. The method of claim 20 wherein the step of extending the slideable carriage member from the second position downwardly to the third fully-tilted and downwardly-telescoped position includes further paying out the cable using a cable-spooling mechanism.

24. The method of claim 20 including the step of controlling the cable with a reversible motor, sensing tension in the cable, and disabling the motor in response to reduced tension in the cable.

25. The method of claim 24 wherein the step of sensing tension in the cable includes a sensor contacting the cable with an idler roller at one end of a spring-loaded pivotable lever arm and having a stop member at the other end of the spring-loaded pivotable lever for interrupting a photocell when the cable tension is reduced.

26. The method of claim 17 including the step of mechanically locking the one end of the elongated pivoting member to the base with a safety latch in the first locked-down home position.

27. The method of claim 26 using a spring-loaded hook which is connected to a cable connected to a mechanically-positioned control member.

28. The method of claim 27 further including the step of rotating the mechanically positioned control member to position a wiper attached thereto to interrupt a photocell coupled to a controller for the motor.

29. The method of claim 17 further includes sensing rotation of the pulley with a shaft encoder connected to a motor, sensing a length of the cable with an integrated circuit controller which remembers the home position and shutting off a system after 30 second timeouts, a relay which switches the motor polarity at the end of a cycle, and an audible signal which sounds during operation.

* * * * *

UNITED STATES PATENT AND TRADEMARK OFFICE
CERTIFICATE OF CORRECTION

PATENT NO. : 5,850,891
INVENTOR(S) : Joseph Jeffery Olms, et. al.
DATED : December 22, 1998

It is certified that error appears in the above-identified patent and that said Letters Patent is hereby corrected as shown below:

Title page, item [73], Assignee: should read – Tailgater, Inc., Salinas, CA. --.

Signed and Sealed this

Fourteenth Day of September, 1999

*Attest:*

Q. TODD DICKINSON

*Attesting Officer*     *Acting Commissioner of Patents and Trademarks*